United States Patent
Tanazawa et al.

(10) Patent No.: US 9,575,281 B2
(45) Date of Patent: Feb. 21, 2017

(54) LENS ARRAY FABRICATION METHOD, AND FILM CONTAINING BASE PLATE AND FILM ATTACHING INSTRUMENT EMPLOYED IN SAME

(71) Applicants: ENPLAS CORPORATION, Kawaguchi-shi, Saitama (JP); TOMOEGAWA CO., LTD., Chuo-ku, Tokyo (JP)

(72) Inventors: Masahiro Tanazawa, Kawaguchi (JP); Shimpei Morioka, Kawaguchi (JP); Makoto Goto, Shizuoka (JP); Nobuhiro Hashimoto, Shizuoka (JP)

(73) Assignees: ENPLAS CORPORATION, Kawaguchi-shi (JP); TOMOEGAWA CO., LTD., Tokyo (JP)

( * ) Notice: Subject to any disclaimer, the term of this patent is extended or adjusted under 35 U.S.C. 154(b) by 99 days.

(21) Appl. No.: 14/371,932

(22) PCT Filed: Dec. 28, 2012

(86) PCT No.: PCT/JP2012/084095
§ 371 (c)(1),
(2) Date: Jul. 11, 2014

(87) PCT Pub. No.: WO2013/114784
PCT Pub. Date: Aug. 8, 2013

(65) Prior Publication Data
US 2015/0020964 A1    Jan. 22, 2015

(30) Foreign Application Priority Data
Jan. 30, 2012  (JP) .................................. 2012-016959

(51) Int. Cl.
B32B 37/00   (2006.01)
G02B 7/00    (2006.01)
(Continued)

(52) U.S. Cl.
CPC ............... *G02B 7/004* (2013.01); *B32B 38/10* (2013.01); *B32B 43/00* (2013.01); *G02B 3/0012* (2013.01);
(Continued)

(58) Field of Classification Search
CPC ........ B32B 37/06; B32B 38/10; B32B 43/006; G02B 3/0012; G02B 6/2845; G02B 6/4204; G02B 7/004; G02B 6/3845
(Continued)

(56) References Cited

U.S. PATENT DOCUMENTS 5,164,589 A * 11/1992 Sjodin .................. G01N 21/552
                                                250/227.24
2002/0176172 A1   11/2002 Nemoto et al.
(Continued)

FOREIGN PATENT DOCUMENTS

EP    1004907 A2   5/2000
EP    1918746 A1   5/2008
(Continued)

OTHER PUBLICATIONS

Supplementary European Search Report (SESR) dated Sep. 7, 2015, issued for corresponding European patent application No. EP12867466.
(Continued)

*Primary Examiner* — John Goff
(74) *Attorney, Agent, or Firm* — Law Office of Katsuhiro Arai

(57) ABSTRACT

A lens array fabrication method for fabricating a lens array includes: receiving pins of a film attaching instrument (jig) in second guide holes of a film-containing base plate; bonding a placement area and an adhesion layer (F); removing the pins; causing a detachment between a first detachment film (C) and a pressure-sensitive adhesive optical film
(Continued)

(D); separating three layers (D) to (F) from two layers (B) and (C); receiving the pins in first guide holes of a lens array main unit; fitting a film holding protrusion in a depression part; bonding the film (D) to a bonding region (i); removing the pins; and causing a detachment between the film (D) and a second detachment film (E).

2 Claims, 15 Drawing Sheets

(51) Int. Cl.
    *B32B 38/10*    (2006.01)
    *B32B 43/00*    (2006.01)
    *G02B 3/00*    (2006.01)
    *G02B 6/38*    (2006.01)
    *G02B 6/42*    (2006.01)
    *G02B 6/32*    (2006.01)

(52) U.S. Cl.
    CPC ........... G02B 3/0056 (2013.01); G02B 3/0075 (2013.01); G02B 6/32 (2013.01); G02B 6/3845 (2013.01); G02B 6/3885 (2013.01); G02B 6/4204 (2013.01); G02B 6/4249 (2013.01); Y10T 156/1089 (2015.01); Y10T 156/1195 (2015.01)

(58) Field of Classification Search
    USPC ................................ 156/247, 249, 719, 767
    See application file for complete search history.

(56) References Cited

U.S. PATENT DOCUMENTS

| | | |
|---|---|---|
| 2004/0202812 A1 | 10/2004 | Congard et al. |
| 2006/0078252 A1 | 4/2006 | Panotopoulos |
| 2008/0099150 A1 | 5/2008 | Hashimoto et al. |
| 2011/0198035 A1 | 8/2011 | Hashimoto et al. |

FOREIGN PATENT DOCUMENTS

| | | | |
|---|---|---|---|
| JP | 2003-248156 A | | 9/2003 |
| JP | 2003-337206 A | | 11/2003 |
| JP | 2006221031 A | * | 8/2006 |
| JP | 4644218 B2 | | 3/2011 |
| WO | 2010/050183 A1 | | 5/2010 |

OTHER PUBLICATIONS

International Search Report (ISR), mailed Apr. 16, 2013, issued for International Application No. PCT/JP2012/084095.

* cited by examiner

LENS ARRAY FABRICATION METHOD, AND FILM CONTAINING BASE PLATE AND FILM ATTACHING INSTRUMENT EMPLOYED IN SAME

This application is the U.S. National Phase under 35 U.S.C. §371 of International Application PCT/JP2012/084095, filed Dec. 28, 2012, which claims priorities to Japanese Patent Application No. 2012-016959, filed Jan. 30, 2012. The International Application was published under PCT Article 21(2) in a language other than English.

TECHNICAL FIELD

The present invention relates to a method of fabricating a lens array and also relates to a film-containing base plate and a film attaching instrument (jig) employed in the lens array fabrication method. In particular, the present invention relates to a lens array fabrication method that is suitable for fabricating a lens array to which a pressure-sensitive adhesive optical film is bonded, and relates to a film-containing base plate and a film attaching jig used in such fabrication method.

BACKGROUND ART

In recent years, the application of the so-called optical interconnection is widespread as the technology for transmitting signals at high speed in a system device, between system devices or between optical modules. The optical interconnection is the technique that treats an optical component like an electrical component, and allows the optical component to be implemented in a motherboard or a circuit board used in a personal computer, a vehicle or an optical transceiver.

The optical module for use in such optical interconnection has a variety of applications such as an internal connection of the media converter and switching hub, as well as component connection in a device or between devices (e.g., optical transceivers, medical equipment, test equipment, video system, and high-speed computer cluster).

There is an increasing demand for an lens array, in which a plurality of small-diameter lenses are arranged, as an optical component which is applied to the above-mentioned type of optical module. The lens array may be able to realize a compact structure for multichannel optical communications.

Conventionally, a photoelectric conversion device equipped with a plurality of light emitting elements (for example, VCSEL: Vertical Cavity Surface Emitting Laser) can be attached (or coupled) to the lens array, and a plurality of optical fibers can be coupled to the lens array as optical transmission medium.

With the photoelectric conversion device and the optical fibers being coupled to the lens array, the lens array can optically connect (couple) the light emitted from the light emitting elements of the photoelectric conversion device to the ends of the optical fibers respectively to perform multichannel optical transmissions.

Conventionally, in the optical communication using an optical fiber (or optical fibers), it is required to attenuate an amount of light coupled into the optical fiber for the reasons of communication standard and safety. Such requirement is also applied to the lens array.

Patent Literature 1 (Japanese Patent No. 4644218) and Patent Literature 2 (PCT International Publication No. WO 2010/050183 A1) disclose the technique to cause the two optical connectors to abut onto each other, with an adhesive connecting member being interposed, and connect these optical connectors by means of the adhesiveness of the adhesive connecting member. More specifically, the technique of Patent Literature 1 (Japanese Patent No. 4644218) and Patent Literature 2 (PCT International Publication No. WO 2010/050183 A1) prepares a jig for adhering the adhesive connecting member. The jig has an insertion hole, and a detachment film and the adhesive connecting member are stacked on a bottom face of the insertion hole. The optical connector is inserted into the insertion hole of the jig, and the front end face of the connector is joined to the adhesive connecting member by means of its adhesiveness. Upon pulling out the optical connector from the insertion hole, the adhesive connecting member that is now attached to the optical connector is peeled (detached) from the detachment film. In this manner, the optical connector having a front end face to which the adhesive connecting member is attached is caused to abut onto the mating optical connector to couple the two optical connectors. A stress generated upon the abutting can cause the adhesive connecting member to appropriately attach (adhere) between the two optical connectors, without adhesion failure such as wrinkles, bubbles, rolling up, and floating.

If the technique disclosed in Patent Literature 1 (Japanese Patent No. 4644218) and Patent Literature 2 (PCT International Publication No. WO 2010/050183 A1) is applied to an adhesive light attenuation film to attach the light attenuation film to a given lens array, it can be expected that a particular optical feature (optical attenuation in this specification) is imparted to the lens array at low cost.

PRIOR ART LITERATURES

Patent Literatures

PATENT LITERATURE 1: Japanese Patent No. 4644218
PATENT LITERATURE 2: PCT International Publication No. WO 2010/050183 A1

SUMMARY OF THE INVENTION

Problems to be Solved by the Invention

When the light attenuation film is attached to the lens array, the light attenuation film alone should be attached onto the concave optical plane having a certain depth, without connecting to other optical components in a certain application. Under such condition, the teaching of Patent Literature 1 (Japanese Patent No. 4644218) and Patent Literature 2 (PCT International Publication No. WO 2010/050183 A1), i.e., abutting the two optical components (optical connectors) each other, is not simply used. Accordingly, an additional approach for reducing the adhesion failure (e.g., wrinkles, bubbles, rolling up, and floating) is needed in order to attach the light attenuation film to the lens array.

In the lens array, the different lens are arranged close to each other. Therefore, if the attaching position of the light attenuation film is shifted from a desired position, the light attenuation may be imparted to an unintended lens. To avoid this, the light attenuation film should be attached at high precision. On the other hand, if complicated positioning work (alignment work) is required to perform precise attachment of the light attenuation film, it may entail an increase in cost. Thus, the work for attaching the light attenuation film must be kept to the minimum.

When the light attenuation film is attached to the lens array, it is necessary to press (push) the light attenuation film onto (or toward) the optical plane to a certain extent, in order to obtain a suitable adhesiveness of the light attenuation film. However, if the stress is continuously applied to the light attenuation film after the attaching, the optical features of the light attenuation film may significantly be deteriorated. Such deterioration should certainly be avoided. Specifically, when the light attenuation film is used for the lens array, and the optical fibers and the photoelectric conversion device are coupled to the lens array in an actual application, no stress should be applied on the light attenuation film that is already attached to the optical plane upon coupling the optical fibers or the photoelectric conversion device to the lens array and after coupling the optical fibers or the photoelectric conversion device to the lens array.

The present invention is proposed in view of these facts, and an object of the present invention is to provide a lens array fabrication method that can easily and appropriately impart a particular optical feature based on an adhesive optical film at low cost. Another object of the present invention is to provide a film-containing base plate and a jig for attaching a film, which are used for the lens array fabrication method.

Means for Solving Problem

In order to achieve the above-mentioned objects, a lens array fabrication method according to a first aspect of the present invention provides an improved lens array fabrication method of fabricating a lens array. The lens array includes a lens array main unit (I) and a pressure-sensitive adhesive optical film (D). The lens array main unit (I) includes a first surface and a second surface spaced from each other in an optical axis direction (referred to as a z-direction hereinafter). The lens array main unit (I) also includes a plurality of lens surfaces aligned on the first surface along a predetermined alignment direction which is perpendicular to the z-direction (referred to as an x-direction hereinafter). The lens array main unit (I) also includes a planar optical plane on the second surface, through which light having passed the lens surfaces is to pass. When the lens surfaces are projected from the z-direction on the second surface, a projected region is formed on the second surface, and the optical plane defines a predetermined central area of the second surface that encompasses the entire projected region. A surrounding area (peripheral area) is defined around the central area. The optical plane is defined by a recess that is concave relative to the surrounding area and depressed (caved in) toward the lens surfaces. The optical plane extends in a direction perpendicular to the z-direction. The lens array main unit (I) also includes a pair of first guide holes or guide pins that are disposed on opposite sides over the optical plane in the x-direction on the surrounding area of the second surface. The first guide holes or guide pins extend parallel to the z-direction. An adhesion area or attaching area (i) is defined, which contains part of the projected region for at least some of the lens surfaces among all the lens surfaces, on the optical plane of the lens array main unit (i). The pressure-sensitive adhesive optical film (D) is attached on the adhesion area (i) by the adhesive force of the pressure-sensitive adhesive optical film itself. The lens array fabrication method includes preparing a film-containing (film-carrying) base plate (II) that contains the pressure-sensitive adhesive optical film (D). The film-containing base plate (II) has a base plate main element (A), and the base plate main element (A) has a placement area (ii) on one face (first face) of the base plate main element (A) in a z"-direction that corresponds to the z-direction. The placement area (ii) corresponds to the adhesion area (i). In the placement area (ii), there are stacked a bonding layer (B), a non-adhesive first detachment film (C), the pressure-sensitive adhesive optical film (D), a non-adhesive second detachment film (E), and an adhesion layer (F) in this order from the placement area (ii). A first peel strength (first detachment strength) $f_{(C)-(D)}$ between the first detachment film (C) and the pressure-sensitive adhesive optical film (D) is smaller than a second peel strength $f_{(D)-(E)}$ between the pressure-sensitive adhesive optical film (D) and the second detachment film (E). A pair of second guide holes or guide pins, which correspond to the pair of first guide holes/guide pins respectively, are provided in a region outside the placement area (ii) on the first face of the base plate main element (A). The second guide holes or guide pins are disposed on both sides (opposite sides) over the placement area (ii) in the x"-direction, which corresponds to the x-direction. The second guide holes or guide pins are parallel to the z"-direction. The lens array fabrication method also includes preparing a film attaching jig (III) for attaching (adhering) the pressure-sensitive adhesive optical film (D) onto the adhesion area (i). The jig (III) has a main body, and the main body has one end face (first end face) in a z'-direction which corresponds to the z-direction. The first end face of the jig main body is an end face to be directed to the film-containing base plate (II) and the lens array main unit (I). The jig (III) has a film holding projection that is provided on the first end face of the jig. The film holding projection protrudes in parallel to the z'-direction toward the film-containing base plate (II) and the lens array main unit (I). The film holding projection has a holding area (iii) at its front end face, and the holding area (iii) corresponds to the adhesion area (i) and the placement area (ii). The holding area (iii) is configured to be able to temporarily hold the pressure-sensitive adhesive optical film (D) when the film holding projection or the holding area (iii) works together with the film-containing base plate (II) and the lens array main unit (I). The jig (III) also has a pair of pins or holes disposed on the first end face of the jig main body in parallel to the z'-direction. This pair of pins or holes are provided at opposite positions over the film holding projection in the x'-direction which corresponds to the x-direction. This pair of pins or holes of the jig (III) correspond to the pair of first guide holes/guide pins and also correspond to the pair of second guide holes/guide pins. The positions and the dimensions of the placement area (ii), the film holding projection, the optical plane and the lens surfaces in the lens array main unit (I), the film-containing base plate (II) and the film attaching jig (III) are decided, with the center points of the first guide holes/guide pins, the second guide holes/guide pins and the pins/holes being the references, such that the holding area (iii) which corresponds to the placement area (ii) in position and dimension can be formed on the front end face (free end face) of the film holding projection, the adhering area (i) which corresponds to the holding area (iii) in position and dimension can be formed on the optical plane, and the film holding projection can be received in the recess of the second surface. With the foregoing being the prerequisite, the characterizing feature of the lens array fabrication method includes the following four steps (first to fourth steps) that are carried out sequentially. In the first step, the pair of pins/holes of the film attaching jig (III) are received in the pair of second guide holes/guide pins of the film-containing base plate (II) while the front end face of the film holding projection of the film attaching jig (III) is exposed to the stacked elements (B) to (F) on the placement area (ii) of the film-containing base plate (II). Then, in the first step, the holding area (iii) of the film holding projection is attached to the upper face of the adhesive layer (F), which is the uppermost layer, by the adhesive force of the adhesive layer (F). In the second step subsequent to the first step, the pair of pins/holes are removed from the pair of second guide holes/guide pins, and detachment is caused between the first detachment film (C) and the pressure-sensitive adhesive optical film (D) by taking advantage of the magnitude relation between the first peel strength $f_{(C)-(D)}$ and the second peel strength $f_{(D)-(E)}$. With the upper three layers (D) to (F) being held on the holding area (iii) of the film holding projection, the second step also includes separating the upper three layers from the lower two layers (B) and (C) which remain on the base plate main element (A). Subsequent to the second step, the third step is carried out. In the third step, the pair of pins/holes are received in the pair of first guide holes/guide pins of the lens array main unit (I) while the three layers (D) to (F) held on the holding area (iii) of the film holding projection are exposed to the optical plane of the lens array main unit (I). In the third step, the film holding projection is inserted in the recess of the second surface together with the three layers (D) to (F), and the lower face of the pressure-sensitive adhesive optical film (D), which is the lowermost layer among the three layers (D) to (F), is attached to the adhesive area (i) on the optical plane by the adhesive force of the pressure-sensitive adhesive optical film (D). The fourth step is carried out after the third step. In the fourth step, the pair of pins/holes are removed from the pair of first guide holes/guide pins, and detachment or peeling is caused between the pressure-sensitive adhesive optical film (D) and the second detachment film (E) such that the upper two layers (E) and (F) are held on the holding area (iii) of the film holding projection, and the upper two layers are separated from the pressure-sensitive adhesive optical film (D) which remains on the adhesive area (i). By carrying out the first to fourth steps sequentially, the lens array fabrication method provides the lens array with the pressure-sensitive adhesive optical film (D) being attached onto the adhesive area (i) and with the pressure-sensitive adhesive optical film (D) being received in the recess that is depressed from the surrounding region of the second surface toward the lens surfaces.

In this specification, the "peel strength (detachment strength)" is based on a measuring method in compliance with "JIS-Z0237, 90-degree-peeling adhesive-force in a test for pressure-sensitive adhesive tape and pressure-sensitive adhesive sheet."

With the invention defined by the first aspect, the film holding projection of the film attaching jig (III) is used to cause the pressure-sensitive adhesive optical film (D) held on the holding area (iii) of the film attaching jig (III) to reach the optical plane received in the recess of the lens array main unit (I). Thus, it is possible to attach the pressure-sensitive adhesive optical film (D) onto the adhesive area (i) which corresponds to at least certain part of the lens surfaces on the optical plane in an appropriate manner with reduced adhesion defects. Because the film-containing base plate (II) has a plurality of peel strengths that are arranged in an ingenious way depending upon the desired order of peeling and such film-containing base plate (II) is used, it is possible to easily attach the pressure-sensitive adhesive optical film (D) by performing a simple step of transferring (passing, handing over) the pressure-sensitive adhesive optical film (D) to the film attaching jig (III) from the film-containing base plate (II) and a simple step of transferring the pressure-sensitive adhesive optical film (D) to the lens array main unit (I) from the film attaching jig (III). In addition, when the pressure-sensitive adhesive optical film (D) is attached, the pins/holes of the film attaching jig (III) are guided and supported by the second guide holes/guide pins of the film-containing base plate (II) and the first guide holes/guide pins of the lens array main unit (I) such that the transferring of the pressure-sensitive adhesive optical film (D) between the film-containing base plate (II) and the film attaching jig (III) becomes smooth, and the transferring of the pressure-sensitive adhesive optical film (D) between the film attaching jig (III) and the lens array main unit (I) becomes smooth. Thus, the work for attaching the pressure-sensitive adhesive optical film (D) is further facilitated. When the pressure-sensitive adhesive optical film (D) is attached, the center points of the pins/holes of the film attaching jig (III), the center points of the second guide holes/guide pins of the film-containing base plate (II) and the center points of the first guide holes/guide pins of the lens array main unit (I) are used as the references, and the locations and dimensions of the placement area (ii), the film holding projection, the optical plane and the lens surfaces are decided (selected) such that the appropriate relationship (conformity) in position and dimension among the placement area (ii), the holding area (iii) and the adhering area (i) is ensured and such that the film holding projection is appropriately received in the recess of the second face. As a result, it is possible to realize the attachment of the pressure-sensitive adhesive optical film (D) at high precision by the simple steps. Because the pressure-sensitive adhesive optical film (D) does not protrude from the peripheral area (surrounding area) of the second face after the pressure-sensitive adhesive optical film (D) is attached to the adhering area (i), no stress applies on the attached pressure-sensitive adhesive optical film (D) when an optical transmission element or a photoelectric conversion device is mounted. As such, the expected objects and advantages of the present invention are surely attained.

Characterizing features of the lens array fabrication method according to a second aspect of the present invention, which depends from the first aspect, lie in that the optical plane of the lens array main unit (I) has a rectangular shape, when viewed in the z-direction, having a long side in the x-direction and a short side in a direction perpendicular to the x-direction and z-direction (referred to as a y-direction, hereinafter), a first hypothetical line segment, which connects center points of the pair of first guide holes/guide pins of the lens array main unit (I) and extends in a direction perpendicular to the z-direction, is parallel to the x-direction and overlaps a center line of the optical plane in the y-direction, when viewed in the z-direction, a vertical bisector, which equally divides the first hypothetical line segment and extends parallel to the y-direction, overlaps a center line of the optical plane in the x-direction, when viewed in the z-direction, the stacked elements (B) to (F) on the placement area (ii) of the film-containing base plate (II) has a rectangular shape, which is defined by contour lines in the x"-direction and contour lines in a y"-direction, when viewed from the z"-direction, the y"-direction being perpendicular to the x"-direction and the z"-direction, a second hypothetical line segment, which connects center points of the pair of second guide holes/guide pins and extends in a direction perpendicular to the z"-direction, is parallel to the x"-direction, a front end face of the film holding projection of the film attaching jig (III) has a rectangular shape, when viewed from the z'-direction, having a long side in the x'-direction and a short side in a y'-direction, the y'-direction being perpendicular to the x'-direction and the z'-direction, a third hypothetical line segment, which connects center points of the pair of pins/holes of the film attaching jig (III) and extends in a direction perpendicular to the z'-direction, is parallel to the x'-direction and overlaps a center line of the front end face of the film holding projection in the y'-direction, when viewed from the z'-direction, a second vertical bisector, which equally divides the third hypothetical line segment and extends parallel to the y'-direction, overlaps a center line of the free end face of the film holding projection in the x'-direction, when viewed in the z'-direction, the lens array main unit (I), the film-containing base plate (II) and the film attaching jig (III) satisfy conditional expressions (1) to (4) for the y-direction, the y'-direction and the y"-direction:

$$a1 + \Delta y > a1' + \Delta y' \geq b'' + \Delta y'' \quad (1)$$

$$a2 + \Delta y > a2' + \Delta y' \geq |a'' - b''| + \Delta y'' \quad (2)$$

$$b'' + \Delta y'' > b1 + \Delta y \quad (3)$$

$$|a'' - b''| + \Delta y'' > |b1 - b2| + \Delta y \quad (4)$$

the lens array main unit (I), the film-containing base plate (II), and the film attaching jig (III) satisfy conditional expressions (5) to (8) for the x-direction, the x'-direction and the x"-direction:

$$c1 + \Delta x > c1' + \Delta x' \geq d'' + \Delta x'' \quad (5)$$

$$c2 + \Delta x > c2' + \Delta x' \geq |c'' - d''| + \Delta x'' \quad (6)$$

$$d'' + \Delta x'' > d1 + \Delta x \quad (7)$$

$$|c'' - d''| + \Delta x'' > |d1 - d2| + \Delta x \quad (8)$$

where parameters of the conditional expressions (1) to (8) for the lens array main unit (I) are:

a1: distance in the y-direction from the center position of the optical plane in the y-direction to a first long side of the optical plane, which defines the outer circumference of the optical plane and extends along the x-direction, a2: distance in the y-direction from the center position of the optical plane in the y-direction to an opposite long side of the optical plane, which defines the outer circumference of the optical plane on an opposite side of the first long side, b1: distance from the center position of the optical plane in the y-direction to a distal end of said part of the projected region for said at least part of the lens surfaces in the y-direction, b2: dimension of said part of the projected region for said at least part of the lens surfaces in the y-direction, c1: distance in the x-direction from the center position of the optical plane in the x-direction to a first short side of the optical plane, which defines the outer circumference of the optical plane and extends along the y-direction, c2: distance in the x-direction from the center position of the optical plane in the x-direction to an opposite short side of the optical plane, which defines the outer circumference of the optical plane on an opposite side of the first short side, d1: distance from the center position of the optical plane in the x-direction to a distal end of said part of the projected region for said at least part of the lens surfaces in the x-direction, d2: dimension of said part of the projected region for said at least part of the lens surfaces in the x-direction, $\Delta y$: sum of a position tolerance of each said lens surface in the y-direction with the centers of the first guide holes/guide pins being the reference, diameter tolerance of each said lens surface in the y-direction, and dimension tolerance of the optical plane in the y-direction, $\Delta x$: sum of a position tolerance of each said lens surface in the x-direction with the centers of the first guide holes/guide pins being the reference, diameter tolerance of each said lens surface in the x-direction, and dimension tolerance of the optical plane in the x-direction, parameters of the conditional expressions (1) to (8) for the film attaching jig (III) are:

a1': distance in the y'-direction from a center position of the front end face of the film holding projection in the y'-direction to a first long side of the front end face, which defines an outer circumference of the front end face and extends along the x'-direction, a2': distance in the y'-direction from the center position of the front end face of the film holding projection in the y'-direction to an opposite long side of the front end face, which defines the outer circumference of the front end face on an opposite side of the first long side, c1': distance in the x'-direction from the center position of the front end face of the film holding projection in the x'-direction to a first short side of the front end face, which defines the outer circumference of the front end face and extends along the y'-direction, c2': distance in the x'-direction from the center position of the front end face of the film holding projection in the x'-direction to an opposite short side of the front end face, which defines the outer circumference of the front end face on an opposite side of the first short side, $\Delta y'$: dimension tolerance of the front end face of the film holding projection in the y'-direction with the centers of the pins/holes being the reference, $\Delta x'$: dimension tolerance of the front end face of the film holding projection in the x'-direction with the centers of the pins/holes being the reference, and parameters of the conditional expressions (1) to (8) for the film-containing base plate (II) are:

a": dimension of the stacked elements (B) to (F) on the placement area (ii) in the y"-direction, b": distance in the y"-direction from the second hypothetical line segment to a distal end of the stacked elements (B) to (F) in the y"-direction, c": dimension of the stacked elements (B) to (F) in the x"-direction, d": distance in the x"-direction from a vertical bisector, which equally divides the second hypothetical line segment and extends in parallel to the y"-direction, to the distal end of the stacked elements (B) to (F) in the x"-direction, $\Delta y''$: dimension tolerance of the stacked elements (B) to (F) in the y"-direction with the centers of the second guide holes/guide pins being the reference, and $\Delta x''$: dimension tolerance of the stacked elements (B) to (F) in the x"-direction with the centers of the second guide holes/guide pins being the reference.

Because the invention defined by the second aspect satisfies the conditional expressions (1) to (8), it is possible to attach the pressure-sensitive adhesive optical film (D) onto the attaching area (i) at higher precision.

A characterizing feature in the lens array fabrication method according to a third aspect of the present invention, which depends from the first aspect or the second aspect, lies in that said at least part of the lens surfaces may be one or more lens surfaces arranged in a single row in the x-direction or all lens surfaces in one or more rows among a plurality of rows arranged respectively in the x-direction, the plurality of rows being spaced from each other in the y-direction.

With the invention defined by the third aspect, it is possible to achieve the attachment of the pressure-sensitive adhesive optical film (D), which are only suited for certain lens surfaces in a flexible manner, depending upon a variety of layout for the lens surfaces.

A characterizing feature in the lens array fabrication method according to a forth aspect of the present invention, which depends from any one of the first to third aspects lies in that the pressure-sensitive adhesive optical film (D) is an optical attenuation film.

With the invention defined by the fourth aspect, it is possible to attach the optical attenuation film in an easy manner at high precision. It is also possible to prevent a stress from being applied onto the optical attenuation film in a reliable manner when an optical transmission unit is coupled.

A characterizing feature in the lens array fabrication method according to a fifth aspect of the present invention, which depends from any one of the first to forth aspects, lies in that the pressure-sensitive adhesive optical film (D) has a multi-layer structure.

With the invention defined by the fifth aspect, it is possible to easily adjust the functions of the pressure-sensitive adhesive optical film (D) such as the optical features (characteristics) and adhesiveness.

A characterizing feature in the lens array fabrication method according to a sixth aspect of the present invention, which depends from any one of the first to fifth aspects, lies in that the first guide holes/guide pins are used for positioning the optical transmission element and/or the photoelectric conversion device when the optical transmission element and/or the photoelectric conversion device is coupled to the lens array.

With the invention defined by the sixth aspect, it is possible to utilize the existing structure of the lens array for attachment of the pressure-sensitive adhesive optical film (D). This can further reduce the cost.

A characterizing feature in the film-containing base plate (II) according to a seventh aspect of the present invention lies in that the film-containing base plate is used in the lens array fabrication method according to any one of the first to sixth aspects.

With the invention defined by the seventh aspect, the lens array main unit (I) and the film attaching jig (III) can be used in combination to impart a particular optical feature, based on the pressure-sensitive adhesive optical film (D), in an easy manner at an appropriately low cost.

Characterizing features in the film-containing base plate (II) according to an eighth aspect of the present invention, which depends from the seventh aspect, lie in that the mold release treatment surfaces of the first detachment film (C) and the second detachment film (E) are both situated on the pressure-sensitive adhesive optical film (D) side, that the second step satisfies the conditional expression (9):

$$f_{(C)-(D)} < f_{(D)-(E)} < f_{(A)-(B)}, f_{(B)-(C)}, f_{(E)-(F)}, f_{(F)-(III)} \quad (9)$$

where $f_{(A)-(B)}$ is a third peel strength between the base plate main element (A) and the bonding layer (adhesive layer) (B), $f_{(B)-(C)}$ is a fourth peel strength between the bonding layer (B) and the first detachment film (C), $f_{(E)-(F)}$ is a fifth peel strength between the second detachment film (E) and the adhesive layer (F), $f_{(F)-(III)}$ is a sixth peel strength between the adhesive layer (F) and the film attaching jig (III), and that the fourth step satisfies the conditional expression (10):

$$f_{(D)-(E)} < f_{(I)-(D)}, f_{(E)-(F)}, f_{(F)-(III)} \quad (10)$$

where $f_{(I)-(D)}$ is a seventh peel strength between the lens array main body (I) and the pressure-sensitive adhesive optical film (D).

A plurality of peel strengths, separated by commas, in the right sides of the conditional expressions (9) and (10) have no particular magnitude relation among the peel strengths. The desired or expected advantages of the eighth aspect can be achieved without deciding the magnitude relation among these peel strengths. Thus, this does not intend to limit the actual magnitude relation. The same applies in the following description.

With the invention defined by the eighth aspect, it is possible to allot the peel strengths in a reliable manner, depending upon the desired order of peeling (detaching).

A characterizing feature of the film attaching jig (III) according to a ninth aspect of the present invention lies in that the film attaching jig is used in the lens array fabrication method according to any one of the first to sixth aspects.

With the invention defined by the ninth aspect, the cooperation between the lens array main unit (I) and the film-containing base plate (II) can impart a particular optical feature based on the pressure-sensitive adhesive optical film (D) in an easy manner at an appropriately low cost.

The present invention can impart a particular optical feature based on the pressure-sensitive adhesive optical film in an easy manner at an appropriately low cost.

BEST MODE FOR CARRYING OUT THE INVENTION

Exemplary methods of fabricating a lens array according to embodiments of the present invention are now described with reference to FIG. 1 to FIG. 27.

<Structure of the Lens Array>

Figure 1:
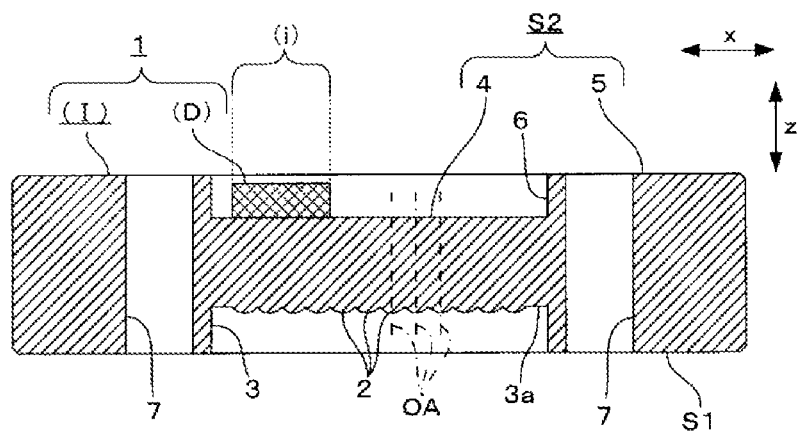
FIG. 1 A cross-sectional view of a lens array in a lens array fabrication method according to one embodiment of the present invention.
Figure 2:
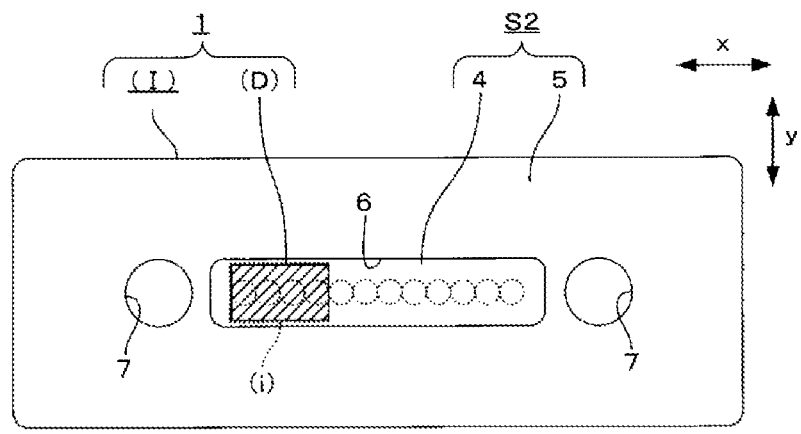
FIG. 2 A plan view of the lens array shown in FIG. 1.
Figure 3:
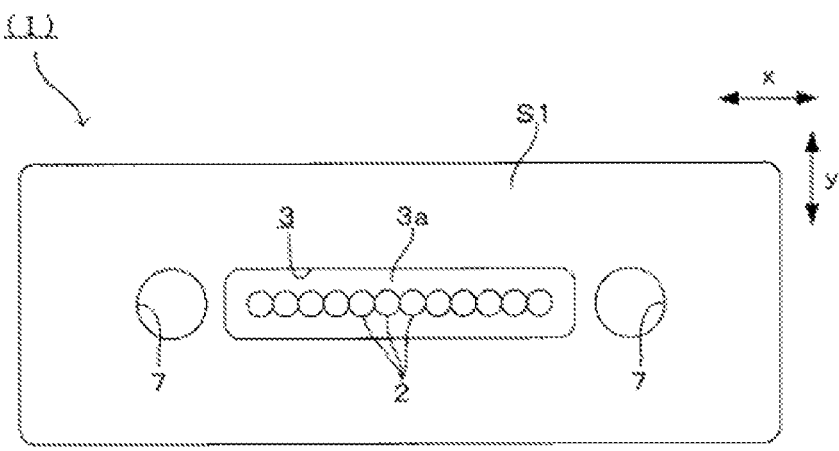
FIG. 3 A bottom view of the lens array shown in FIG. 1.
Figure 4:
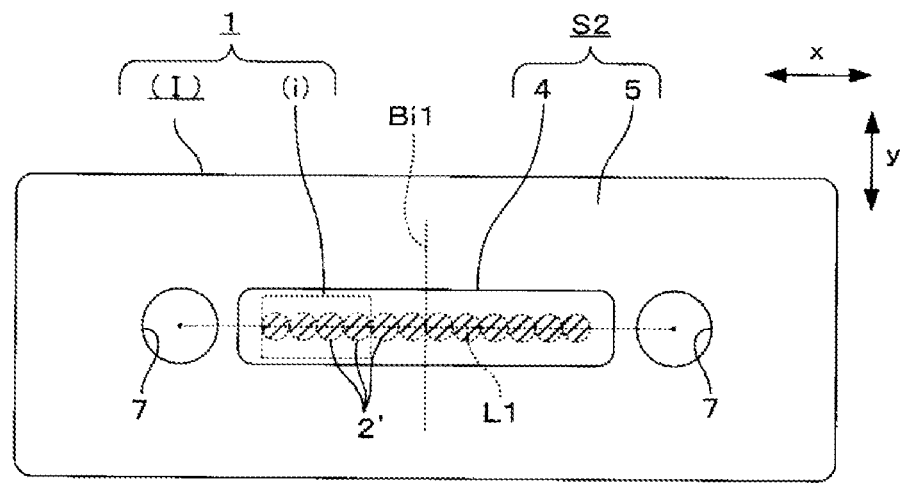
FIG. 4 A plan view of a lens array main body (I) in the lens array shown in FIG. 1.

FIG. 1 shows a cross-sectional view of a lens array 1 which is fabricated by the lens array fabrication method of this embodiment. FIG. 2 is a plan view of the lens array shown in FIG. 1. FIG. 3 is a bottom view of the lens array shown in FIG. 1. FIG. 4 illustrates a plan view of a lens array main unit (I), which will be described later.

As shown in FIGS. 1 to 3, the lens array 1 includes a lens array main unit (I) and a pressure-sensitive adhesive optical film (D).

The lens array main unit (I) has a planar and generally rectangular shape in appearance. The lens array main unit is a plate-like unit. A direction that corresponds to the plate thickness direction is the optical axis direction, and this axis direction is the reference axis of an optical plane. In the following description, the optical axis direction is referred to as a z-direction.

As depicted in FIG. 1, the lens array main unit (I) has a first surface S1 and a second surface S2 which are spaced from each other in the z-direction. The first surface S1 is opposite the second surface S2. Both of the first surface S1 and the second surface S2 extend perpendicularly to the z-direction.

As shown in FIGS. 1 and 3, a plurality of lens surfaces 2 (convex lens surfaces in FIG. 1) are arranged on the first surface S1 in a single row at equal intervals in a predetermined alignment direction (the longitudinal direction) of the lens array main unit (I). In FIG. 3, there are provided twelve lens surfaces 2. All the lens surfaces 2 have the same diameter. Each lens surface 2 has a circular shape when viewed in the plan view. The alignment direction of the lens surfaces 2 is referred to as an x-direction in this specification. As shown in FIG. 3, each two adjacent lens surfaces 2 in the x-direction may contact each other at their outer circumferences. In FIG. 3, each lens surface 2 is formed on a bottom face 3a of a recess 3 in a predetermined position in the center area of the first surface S1. The recess 3 has a generally rectangular shape when viewed in the plan view. The recess 3 is depressed toward the second face S2. The bottom face 3a is parallel to that part of the first surface S1 which extends around the recess 3. As illustrated in FIG. 1, the optical axes OA of the lens surfaces 2 are parallel to each other. These optical axes OA are of course parallel to the z-direction (i.e., the optical axis direction of the lens array).

On the other hand, as shown in FIGS. 1, 2 and 4, the second surface S2 has a generally rectangular center area 4 which is elongated or longer in the x-direction and shorter in a direction (referred to a y-direction, hereinafter) perpendicular to the x-direction and z-direction. The center area 4 defines a predetermined area. A peripheral area 5 has a rectangular frame like shape and surrounds the center area 4. The center area 4 is defined by a recess 6, and depressed toward the lens surfaces 2. In other words, the center area 4 is the bottom face 4 of the recess 6. In addition, the center area 4 is the optical plane 4 through which light passing the lens surfaces 2 will pass later (in case of transmission) or have already passed (in case of receiving). As shown in FIG. 1, the optical plane 4 is flat and extends in parallel to the peripheral area 5 and perpendicular to the z-direction. As illustrated in FIG. 4, the optical plane 4 encompasses the entirety of a projected region 2' (shaded region in FIG. 4), which is formed when the light is projected on the second surface S2 through the lens surfaces 2 in the z-direction.

As shown in FIGS. 1, 2 and 4, a pair of first guide holes 7 are provided in the peripheral area 5 over the optical plane 4 (on opposite sides of the optical plane 4) in the x-direction. Each of the two first guide holes 7 has a circular opening. The two first guide holes 7 have the same diameter. The first guide holes 7 extend in the z-direction in parallel to each other toward the first surface S1. Each of the first guide holes 7 may be a through hole, as shown in FIGS. 1 and 3. Alternatively, each of the first guide holes 7 may have a bottom. As shown in FIG. 4, a first hypothetical line segment L1 that connects the center points of the two first guide holes 7 and extends in a direction perpendicular to the z-direction is parallel to the x-direction and coincides with the center line of the optical plane 4 in the y-direction, when viewed from the z-direction. The center line of the optical plane 4 in the y-direction indicates the center position of the optical plane 4 in the y-direction. The first hypothetical line segment L1 also coincides with the center line of the projected region 2' of the lens surfaces 2 in the y-direction. As shown in FIG. 4, a bisecting normal line Bi1 that equally divides the first hypothetical line segment L1 and extends in parallel to the y-direction coincides with the center line of the optical plane 4 in the x-direction when viewed from the z-direction. The center line of the optical plane 4 in the x-direction indicates the center position of the optical plane 4 in the x-direction.

The bisecting vertical line Bi1 also coincides with the center line of the projected region 2' of all the lens surfaces 2 in the x-direction.

The lens array main unit (I) having the above-described structure may be formed, in the form of a single-piece unit, from a transparent resin material such as polyether imide by means of injection molding with an injection mold.

As shown in FIGS. 1 and 2, the pressure-sensitive adhesive optical film (D) is attached to an attachment area (i) on the optical plane 4 that encompasses the projected region 2' made by some lens surfaces 2 among all of the lens surfaces 2. The adhesive optical film (D) adheres to the attachment area (i) by its own adhesiveness. As shown in FIG. 1, the exposed surface (non-attached side, or the upper surface in FIG. 1) of the pressure-sensitive adhesive optical film (D) is present below the peripheral area 5 or closer to the lens surfaces 2 than the peripheral area 5. The detailed structure of the pressure-sensitive adhesive optical film (D) will be described below.

<Structure of the Film-Containing Base Plate (II)>

Figure 5:
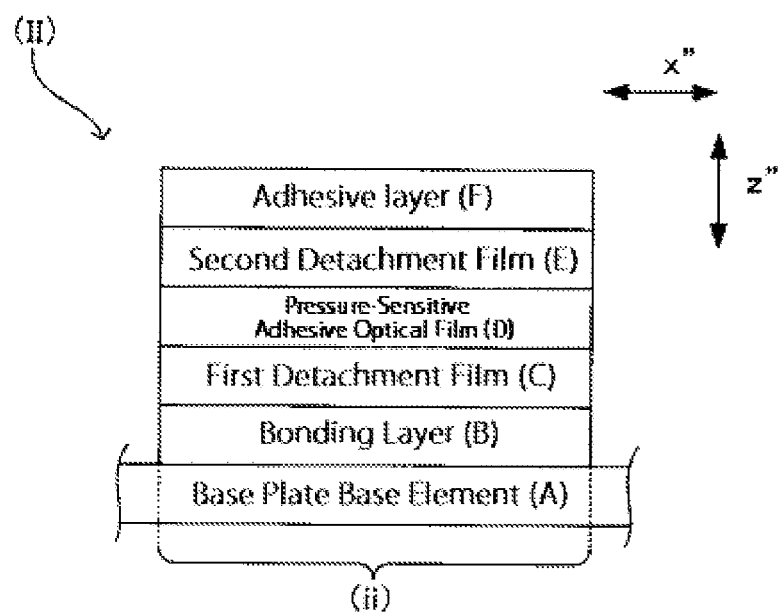
FIG. 5 A schematic structure of the film-containing base plate (II) in an exemplary lens array fabrication method according to the present invention.
Figure 6:
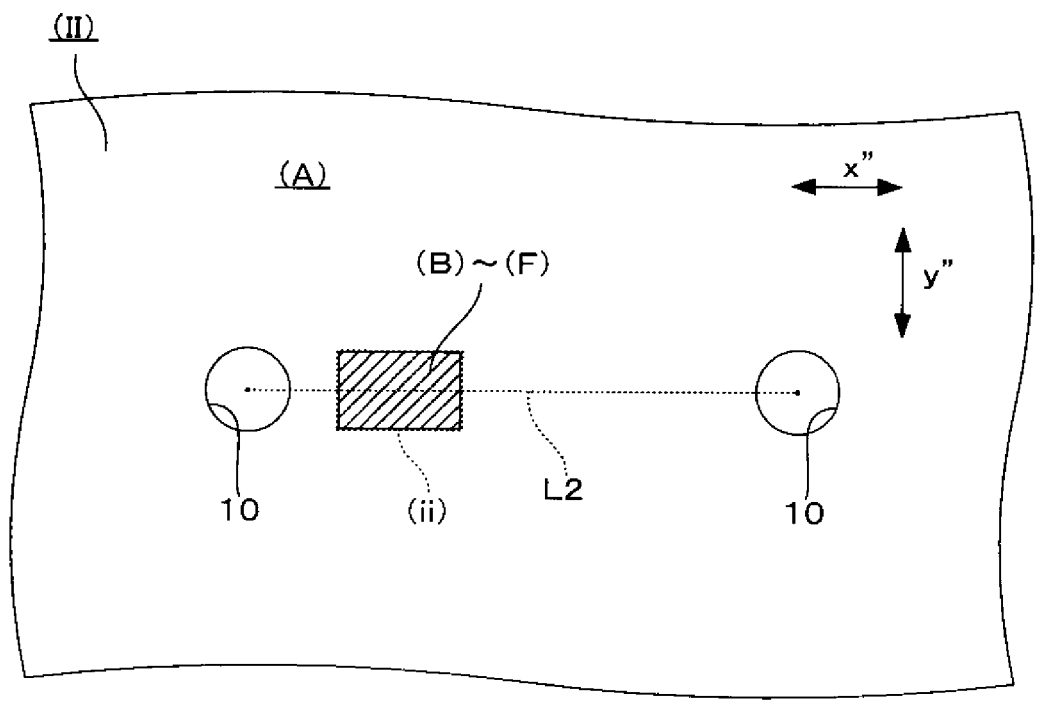
FIG. 6 A plan view of the film-containing base plate (II) shown in FIG. 5.

Referring now to FIG. 5, illustrated is a schematic structure of the film-containing (film-carrying) base plate (II) that is used in the method of manufacturing the lens array 1 according to this embodiment. A plan view of the film-containing base plate (II) is shown in FIG. 6.

In the following description, a direction of a configuration designed on the film-containing base plate (II) corresponding to the x-direction is referred to as an x" direction (i.e., the x"-direction is a direction corresponding to the x-direction), a direction of a configuration designed on the film-containing base plate (II) corresponding to the y-direction is referred to as a y" direction (i.e., the y"-direction is a direction corresponding to the y-direction), and a direction of a configuration designed on the film-containing base plate (II) corresponding to the z-direction is referred to as a z' direction (i.e., the z"-direction is a direction corresponding to the z-direction).

As shown in FIG. 5, the film-containing base plate (II) is a base plate which contains (carries) the pressure-sensitive adhesive optical film (D). The film-containing base plate (II) has a main element or body (A) extending in a direction perpendicular to the z"-direction. On a carrying area (placement area) (ii) in one surface (upper surface in FIG. 5) of the base plate main element (A) in the z"-direction, which corresponds to the attachment area (i), there are stacked an adhesive layer (bonding layer) (B), a non-adhesive first detachment film (C), a pressure-sensitive adhesive optical film (D), a non-adhesive second detachment film (E) and an adhesive layer (F) in the ascending direction from the placement area (ii).

The peel (detachment) strength between the first detachment film (C) and the pressure-sensitive adhesive optical film (D) is referred to as the first peel strength $f_{(C)-(D)}$ and the peel strength between the pressure-sensitive adhesive optical film (D) and the second detachment film (E) is referred to as the second peel strength $f_{(D)-(E)}$. The first peel strength $f_{(C)-(D)}$ is smaller than the second peel strength $f_{(D)-(E)}$. This relative relationship (magnitude relation) of the peel strengths may be obtained (adjusted) by use of different materials for the detachment films (C) and (E), which will be described later. In addition (or alternatively), a detachment functional layer (functional layer for detachment; will be described later) may be provided between the first detachment film (C) and the pressure-sensitive adhesive optical film (D), or between the second detachment film (E) and the pressure-sensitive optical film (D) to adjust the magnitude relation of the peel strengths. For example, the first detachment film (C) may include a detachment functional layer stacked on a base member (will be described) such that the detachment functional layer is located adjacent to the pressure-sensitive adhesive optical film (D), and/or the second detachment film (E) may include a detachment functional layer on a base member (will be described) such that the detachment functional layer is located adjacent to the pressure-sensitive adhesive optical film (D).

Figure 7A:
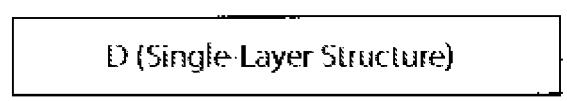
FIGS. 7A and 7B Schematic views showing an exemplary structure of the pressure-sensitive adhesive optical film (D) in the film-containing base plate (II) shown in FIG. 5.
Figure 7B:
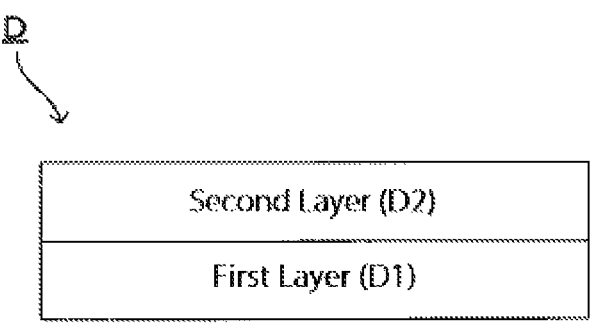

As illustrated in FIG. 7A, the pressure-sensitive adhesive optical film (D) may have a single-layer structure. Alternatively, as shown in FIG. 7B, the pressure-sensitive adhesive optical film (D) may have a multi-layer structure. In FIG. 7B, the pressure-sensitive adhesive optical film (D) has a two-layer structure (layers D1 and D2). When the pressure-sensitive adhesive optical film (D) has a multi-layer structure, it is possible to allot the functions of the pressure-sensitive adhesive optical film (D) to the respective layers in a desired manner (e.g., a layer may be dominant or most influential about the optical attenuation, and another layer may be dominant about adhesiveness). Thus, the adjustment of the functions of the pressure-sensitive adhesive optical film (D) becomes easy. It should be noted that dyes or pigment components (will be described later) may be added to any one of the layers among the multi-layer structure or all the layers of the multi-layer structure.

It should be noted that the base plate main body (A) may be made from an inorganic material or an organic material. The material of the base plate main element (A) is not limited to a particular material. For example, the base plate main element (A) may be made from a glass plate, a metallic plate, a plastic plate or a film. One of these materials may appropriately be selected depending upon the bonding layer (B) to be used.

The material of the bonding layer (B) may be a thermoset resin such as phenolic resin, polyester resin, epoxy resin, urea resin and melamine resin, or thermoplastic resin such as polyethylene resin or polypropylene resin. One of these resins may be used alone, or two or more resins among these resins may be used in combination.

Alternatively, a pressure-sensitive adhesive may be used for the bonding layer (B). The pressure-sensitive adhesive may not be limited to a particular adhesive as long as the adhesiveness is not lost after drying (the adhesive possesses the self-sticking capability after drying) and the adhesive adheres to a desired object upon pressurizing. It is particularly preferred that the pressure-sensitive adhesive is a self-sticking emulsion paint.

Preferably, the self-sticking (self-adhesive) emulsion paint may contain a natural rubber based adhesive composition and a non-adhesive composition such as organic and inorganic fillers that can provide a smooth surface.

Examples of the natural rubber based composition include the raw natural rubber latex, the vulcanized natural rubber latex, and the natural rubber latex which is a graft polymerization of methyl methacrylate (MMA). Examples of the vulcanizing agent for the vulcanized natural rubber latex may be sulfur, sulfur-containing compounds, organic peroxides, metal oxides, organic polyamine and modified phenol resin, etc.

Examples of the organic fillers include powdered cellulose, sweet potato starch, potato starch, wheat starch, corn starch, rice starch, tapioca starch, styrene beads, and methyl methacrylate beads. The average particle (grain) diameter of these organic fillers is large, e.g., 5 to 30 μm (micrometers). Therefore, if such organic filler is added to the pressure-sensitive adhesive, the unevenness or irregularities are made on the surface of the pressure-sensitive adhesive layer, and therefore the adhesion force becomes adjustable. This also improves a blocking resistance and imparts slippage. Accordingly, it is preferred to add the organic filler(s) in the form of powder. When the purpose of the present invention is considered, these particles need to have a smooth surface.

Similar to the organic filler, the material of the inorganic filler is not limited to a particular material and may be any suitable fine particle as long as the material can provide a smooth surface. For example, spherical silica and glass beads are preferred. On the other hand, heavy calcium carbonate, synthetic silica, talc, kaolin clay, zinc oxide, alumina, and mica are not preferred because they are amorphous.

It should be noted that additives such as dispersants, anti-foaming agents, surfactants, anti-aging agents, and UV absorbers may be added to the self-sticking emulsion paint, if necessary.

Furthermore, each of the first detachment film (C) and the second detachment film (E) may be made from any suitable material and may have any suitable base member (no limitations on the composition of the base member and the type of the base member) as long as the first (second) detachment film has a detachment functional layer laminated on the base member. The material of the detachment functional layer may contain a silicone component or a fluorine component. The silicone component may be one of the silicone oil, silicone varnish and silicon resin in this embodiment of the present invention. The base member (base material) preferably has a thickness of approximately 1 μm to 1000 μm. With this thickness range, it is advantageous for the fabrication since the base member is flexible. The lower limit of the thickness of the base member is more preferably 10 μm and further preferably 20 μm. The upper limit of the thickness of the base member is more preferably 200 μm and further preferably 50 μm. The above-mentioned preferable values, more preferable values and further preferable values of the lower and upper limits of the thickness of the base member may be appropriately combined. The material of the base member is preferably paper or resin (plastic) film. The paper or resin film is flexible. The material of the resin film is not limited to a particular material. For example, the resin film may be made from polyethylene terephthalate, polyethylene naphthalate, acrylic resins, polycarbonate, polyimide, polyamide, polyamide-imide, polyether sulfone, polyphenylene sulfide, polyether ketone, polyether imide, triacetyl cellulose, silicone rubber, polytetrafluoroethylene, fluorine resin film, or polyvinyl alcohol film.

Exemplary types of the detachment films (C) and (E) may include a light detachment film, an intermediate weight detachment film and a heavy detachment film, when listed in the decreasing order of the silicone component or fluorine component contained in the detachment functional layer. Any type of the detachment films may be used for the detachment films (C) and (E). It should be noted that a mold release paper may be used as the detachment film.

Because the pressure-sensitive adhesive layer, the detachment functional layer, the bonding layer and other components are provided on the surface of the base member, a preliminary process or treatment is preferably applied to improve applicability of the pressure-sensitive adhesive layer, detachment functional layer, bonding layer on the surface of the base member. The preliminary process may be a physical processing such as corona surface treatment, flame treatment and plasma processing. Because such physical process enhances the peel strength, it is preferred that those parts which need to have enhanced peel strength undergo the physical process.

The pressure-sensitive adhesive optical film (D) may be constituted by a pressure-sensitive adhesive having the dispersed dye or pigment. The solution of the pressure-sensitive adhesive is applied and dried. In this case, the dye may be direct dyes, acid dyes or basic dyes. Examples of the pigment may include isoindolinone pigments, anthraquinone pigments, dioxazine pigments, azo pigments, naphthol pigments, quinophthalone pigments, azomethine pigments, benzimidazolone pigments, perinone pigments, pyranthrone pigments, perylene pigments, hiransuron pigments, phthalocyanine pigments, threne pigments and carbon black pigments. Examples of the pressure-sensitive adhesive include a variety of adhesive including a polymer material, such as acrylic material, epoxy material, vinyl material, silicone material, rubber material, urethane material, methacrylic material, nylon material, bisphenol material, diol material, polyimide material, fluorinated epoxy material and fluorinated acrylic material. If necessary, these materials may be mixed, and/or a curing agent or a fluorine resin may be added. When the pressure-sensitive adhesive optical film (D) has the multilayer structure as described above, the different layers may have different combinations of adhesives and curing agents or contain different amounts of adhesives and curing agents such that the respective or desired layers may possess different functions (for example, different light attenuation factors and/or adhesive forces).

The amount of dye or pigment to be contained may vary with the specifications of the light absorbing material, but preferably it is 0.01 wt % (weight percentage) to 10 wt %.

The thickness of the pressure-sensitive adhesive optical film (D) is preferably smaller than the step (height difference) between the peripheral area 5 of the second surface S2 and the optical plane 4.

In general, the pressure-sensitive adhesive layer (F) may be made from the same (or similar) material as (to) the pressure-sensitive adhesive optical film (D). The pressure-sensitive adhesive layer (F) has a greater adhesiveness than the pressure-sensitive adhesive optical film (D) such that the peel strength between the second detachment film (E) and the pressure-sensitive adhesive layer (F), which is referred to as the fifth peel strength, is greater than the second peel strength.

As shown in FIG. 6, a pair of second guide holes 10 are formed in an area outside the placement area (ii) on the upper surface of the base plate main element (A). The two second guide holes 10 are arranged on both sides of the placement area (ii) in the x"-direction at those positions which correspond to the two first guide holes 7 respectively. The two second guide holes 10 have the same inner diameter and define circular openings. The two second guide holes 10 extend in the z"-direction toward the lower face of the base plate main element (A). It should be noted that each of the second guide holes 10 may be a through hole or have a bottom. It should also be noted that each of the second guide holes 10 may have the same inner diameter as each of the first guide holes 7.

As depicted in FIG. 6, the stacked (laminated) elements (B) to (F) on the placement area (ii) is rectangular when viewed in the z"-direction. One pair of sides of the rectangle extends along the x"-direction and the other pair of sides of the rectangle extends along the y"-direction. These sides define the outer contour of the rectangle. This rectangle matches (overlaps) the shape of the placement area (ii) when viewed in the z"-direction.

As illustrated in FIG. 6, a second hypothetical line segment L2 that connects the respective center points of the two second guide holes 10 in a direction perpendicular to the z"-direction extends parallel to the x"-direction.

<Structure of the Film Attaching Jig (III)>

Figure 8:
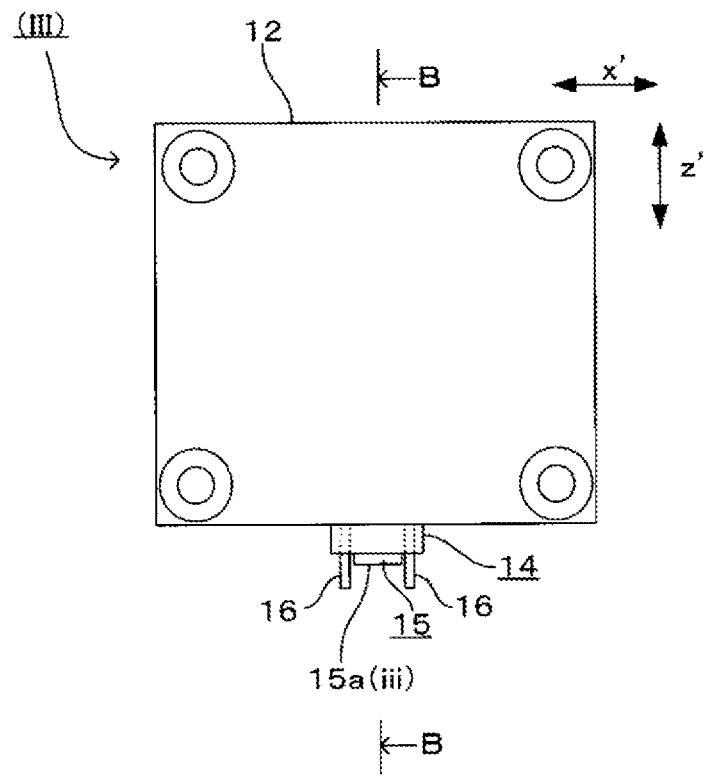
FIG. 8 A front view of a jig (III) for attaching the film used in the lens array fabrication method according to the embodiment of the present invention.
Figure 9:
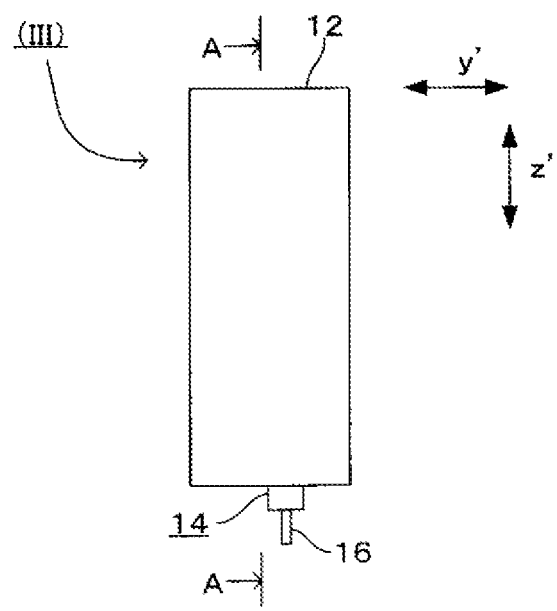
FIG. 9 A right side view of the jig shown in FIG. 8.
Figure 10:
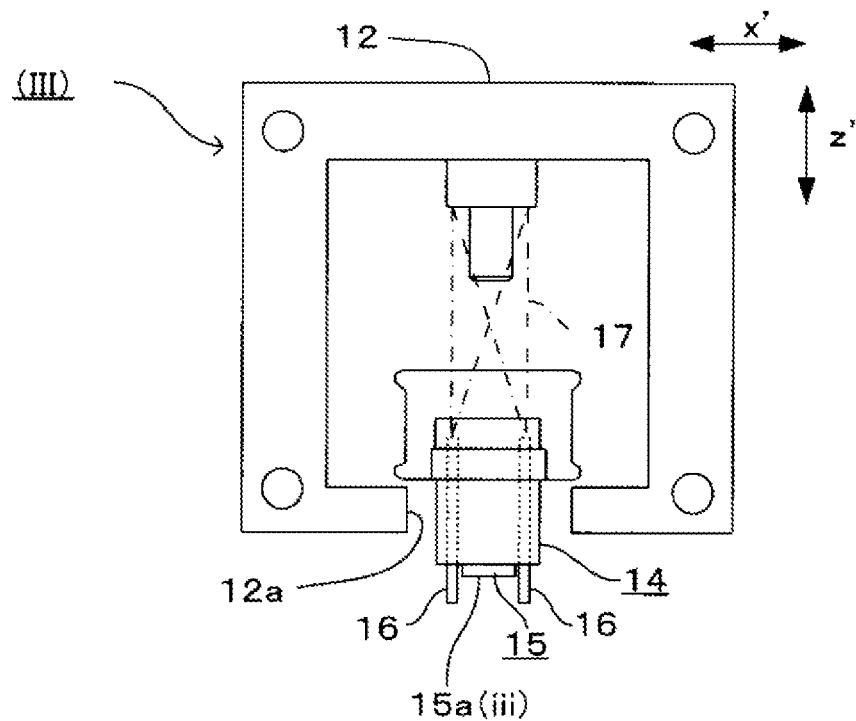
FIG. 10 A cross-sectional view of the jig, taken along the line A-A in FIG. 9.
Figure 11:
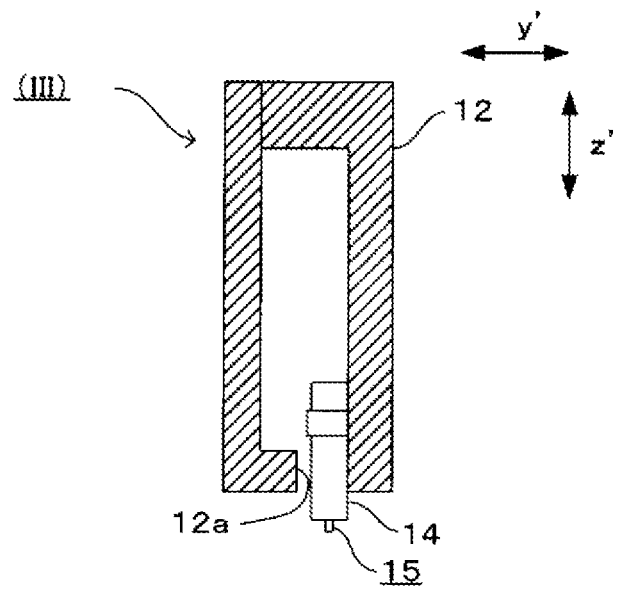
FIG. 11 A cross-sectional view of the jig, taken along the line B-B in FIG. 8.
Figure 12:
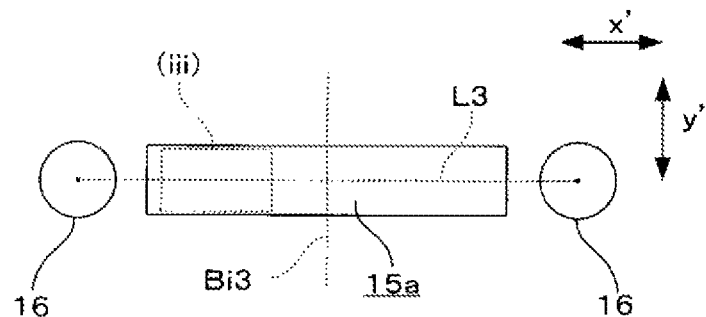
FIG. 12 A bottom view of major components shown in FIG. 8.

Referring now to FIG. 8, illustrated is a front view of the jig (III) for film adhesion (jig main unit), which is used in the method of fabricating the lens array 1 in this embodiment. FIG. 9 shows a right side view of the jig shown in FIG. 8. FIG. 10 is a cross-sectional view taken along the line A-A in FIG. 9. FIG. 11 is a cross-sectional view taken along the line B-B in FIG. 8. FIG. 12 is a bottom view of major components of the jig shown in FIG. 8.

In the following description, a direction of a configuration designed on the film attaching jig (III) corresponding to the x-direction is referred to as a x' direction (i.e., the x'-direction is a direction corresponding to the x-direction), a direction of a configuration designed on the film attaching jig (III) corresponding to the y-direction is referred to as a y' direction (i.e., the y'-direction is a direction corresponding to the y-direction), and a direction of a configuration designed on the film attaching jig (III) corresponding to the z-direction is referred to as a z' direction (i.e., the z'-direction is a direction corresponding to the z-direction).

As shown in FIGS. 8 to 11, the film attaching jig (III) has a housing 12 which is generally shaped like a rectangular parallelepiped. A through hole 12a (see FIGS. 10 and 11) is formed in the bottom wall of the housing 12 such that the through hole 12a extends along the z'-direction. As shown in FIG. 11, a mount 14 is attached to the inner face (front face) of the back wall of the housing 12 in the vicinity of the through hole 12a to mount a major part of the jig. A lower end face of the mount 14 protrudes (is exposed) downward from the housing 12 through the through hole 12a. The lower end face of the mount 14 is an end face which is one end face in the z'-direction and which should face the film-containing base plate (II) and the lens array main unit (I). As illustrated in FIGS. 8 to 11, a projecting portion 15 for holding the film is provided on the lower end face of the mount 14. The projecting portion 15 extends downward in parallel to the z'-direction such that the projecting portion 15 will face the film-containing base plate (II) and the lens array main unit (I). A front end face (lower end face in FIGS. 8 to 11) 15 of the film holding projection 15 has a holding area (iii) (see FIG. 12), which corresponds to the adhesion area (i) and the placement area (ii). The holding area (iii) is able to temporarily hold the pressure-sensitive adhesive optical film (D) when the holding area (iii) works with the film-containing base plate (II) and the lens array main unit (I). The film holding projection 15 may be made from a material that can appropriately adhere the pressure-sensitive adhesive layer (F) thereon (e.g., polyphenyl sulfide, epoxy resin, polycarbonate, and polyether imide).

As shown in FIGS. 8, 10 and 12, a pair of pins 16 are provided on the lower end face of the mount 14. The pins 16 are provided on both sides of the film holding projection 15 in the x'-direction. The two pins 16 correspond to the two first guide holes 7 respectively and correspond to the two second guide holes 10 respectively. The pins 16 have the same diameter, and each of the pins 16 has a circular shape. The pins 16 extend parallel to each other and toward (downward) the film-containing base plate (II) and the lens array main unit (I) in the z'-direction. The outer diameter of the pin 15 is slightly smaller than the inner diameter of the first guide hole 7 and slightly smaller than the inner diameter of the second guide hole 10.

As shown in FIG. 12, the front end face 15a of the film holding projection 15 has a rectangular shape with a longer side being in the x'-direction and a shorter side being in the y'-direction, when viewed in the z'-direction.

As illustrated in FIG. 12, a third hypothetical line segment L3 connecting the center points of the two pins 16, which extends in a direction perpendicular to the z'-direction, is parallel to the x'-direction when viewed in the z'-direction and overlaps the center line of the front end face 15a of the film holding projection 15 in the y'-direction. As depicted in FIG. 12, a line segment (perpendicular bisector) Bi3 that equally divides the third hypothetical line segment L3 and extends in parallel to the y'-direction overlaps the center line of the front end face 15a of the film holding projection 15 in the x'-direction when viewed in the z'-direction.

As shown in FIG. 10, the two pins 16 are biased downward by a biasing member 17, such as a coil spring, disposed in the housing 12.

<Correlation Among (I), (II) and (III)>

The lens array main unit (I), the film-containing base plate (II) and the film attaching jig (III) have respective positions and dimensions for the placement area (ii) (i.e., the stacked elements (B) to (F)), the film holding projection 15, the optical plane 4 and the lens surface 2, with the centers of the first guide holes 7, the second guide holes 10 and the pins 16 being the references. These positions and dimensions allow the holding area (iii), which corresponds to the placement area (ii) in position and dimension, to be present on the front end face 15a of the film holding projection 15, allow the adhesion area (i), which corresponds to the holding area (iii) in position and dimension, to be present on the optical plane 4, and allow the film holding projection 15 to be received in the recess 6 of the second surface S2.

Specifically, the lens array main unit (I), the film-containing base plate (II) and the film attaching jig (III) are configured to satisfy the conditional expressions or equations (1) to (8) shown below.

(Conditional expressions for the y, y' and y" directions)

$$a1+\Delta y > a1'+\Delta y' \geq b''+\Delta y'' \tag{1}$$

$$a2+\Delta y > a2'+\Delta y' \geq |a''-b''|+\Delta y'' \tag{2}$$

$$b''+\Delta y'' > b1+\Delta y \tag{3}$$

$$|a''-b''|+\Delta y'' \geq |b|-b2|+\Delta y \tag{4}$$

(Conditional expressions for the x, x' and x" directions)

$$c1+\Delta x > c1'+\Delta x' \geq d''+\Delta x'' \tag{5}$$

$$c2+\Delta x > c2'+\Delta x' \geq |c''-d''|+\Delta x'' \tag{6}$$

$$d''+\Delta x'' > d1+\Delta x \tag{7}$$

$$|c''-d''|+\Delta x'' > |d1-d2|+\Delta x \tag{8}$$

Parameters in the condition expressions are as follows.

Figure 13:
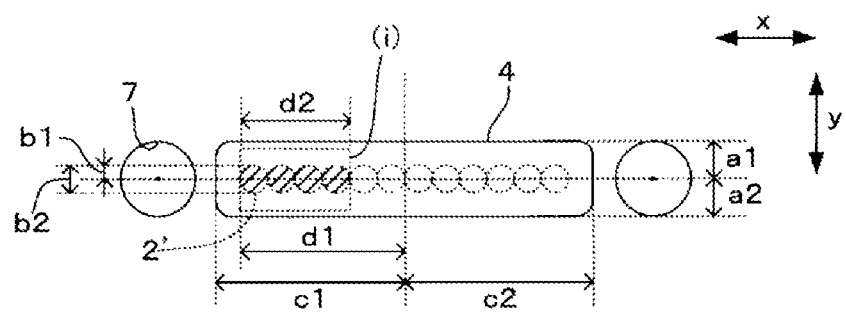
FIG. 13 An explanation view useful to describe parameters for the lens array main unit (I) in conditional expressions in the lens array fabrication method according to the embodiment of the present invention.

<Parameters for the Lens Array Main Unit (I)> a1: This parameter is included in the left side of the expression (1), and represents the distance in the y-direction from the center position of the optical plane 4 in the y-direction to one long side (first long side) of the optical plane 4, which defines the outer circumference (outer contour) of the optical plane 4 and extends along the x-direction, as shown in FIG. 13.

a2: This parameter is included in the left side of the expression (2), and represents the distance in the y-direction from the center position of the optical plane 4 in the y-direction to the other long side of the optical plane 4, which defines the outer circumference of the optical plane 4 on the opposite side of the first long side (mentioned in the parameter a1), as shown in FIG. 13.

b1: This parameter is included in the right side of the expression (3) and the right side of the expression (4), and represents the distance from the center position of the optical plane 4 in the y-direction to the distal end of the projected region 2' for part of the lens surfaces 2 in the y-direction, as shown in FIG. 13.

b2: This parameter is included in the right side of the expression (4), and represents the size of the projected region 2' for part of the lens surfaces 2 in the y-direction, as shown in FIG. 13 (i.e., the dimension of the lens surfaces 2 in the y-direction).

c1: This parameter is included in the left side of the expression (5), and represents the distance in the x-direction from the center position of the optical plane 4 in the x-direction to one short side (first short side) of the optical plane 4, which defines the outer circumference of the optical plane 4 and extends along the y-direction, as shown in FIG. 13.

c2: This parameter is included in the left side of the expression (6), and represents the distance from the center position of the optical plane 4 in the x-direction to the other short side of the optical plane 4, which defines the outer circumference of the optical plane 4 on the opposite side of the first short side (mentioned in the paragraph c1), in the x-direction, as shown in FIG. 13.

d1: This parameter is included in the right side of the expression (7) and the right side of the expression (8), and represents the distance from the center position of the optical plane 4 in the x-direction to the distal end of the projected region 2' for part of the lens surfaces 2 in the x-direction, as shown in FIG. 13.

d2: This parameter is included in the right side of the expression (8), and represents the total size of the projected region 2' for part of the lens surfaces 2 in the x-direction, as shown in FIG. 13 (i.e., the total length of those lens surfaces 2 which correspond to the projected region 2' in the x-direction).

$\Delta y$: This parameter is included in the left sides of the expressions (1) and (2) and the right sides of the expressions (3) and (4), and represents the sum of the position (center position) tolerance of the lens surfaces 2 in the y-direction, the diameter tolerance of the lens surfaces 2 in the y-direction and the dimension tolerance of the optical plane 4 in the y-direction, with the centers of the first guide holes 7 being the references.

$\Delta x$: This parameter is included in the left sides of the expressions (5) and (6) and the right sides of the expressions (7) and (8), and represents the sum of the position tolerance of the lens surfaces 2 in the x-direction, the diameter tolerance of the lens surfaces 2 in the x-direction and the dimension tolerance of the optical plane 4 in the x-direction, with the center of the first guide holes 7 being the references.

Figure 14:
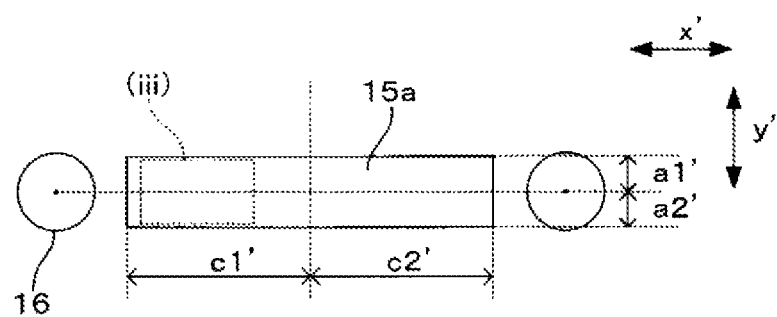
FIG. 14 An explanation view useful to describe parameters for the film attaching jig (III) in the conditional expressions in the lens array fabrication method according to the embodiment of the present invention.

<Parameters for the Film Attaching Jig (III)> a1': This parameter is included in the second left side of the expression (1), and represents the distance in the y'-direction from the center position of the front end face 15a of the film holding projection 15 in the y'-direction to one long side (first long side) of the front end face 15a, which defines the outer circumference of the front end face 15a and extends along the x'-direction, as shown in FIG. 14.

a2': This parameter is included in the second left side of the expression (2), and represents the distance from the center position of the front end face 15a of the film holding projection 15 in the y'-direction to the opposite long side of the front end face 15a, which defines the outer circumference of the front end face 15a on the opposite side of the first long side (mentioned on the parameter a1'), in the y'-direction, as shown in FIG. 14.

c1': This parameter is included in the second left side of the expression (5), and represents the distance in the x'-direction from the center position of the front end face 15a of the film holding projection 15 in the x'-direction to one short side (first short side) of the front end face 15a, which defines the outer circumference of the front end face 15a and extends along the y'-direction, as shown in FIG. 14.

c2': This parameter is included in the second left side of the expression (6), and represents the distance from the center position of the front end face 15a of the film holding projection 15 in the x'-direction to the other short side of the front end face 15a, which defines the outer circumference of the front end face 15a on the opposite side of the first short side (mentioned in the parameter c1'), in the x'-direction, as shown in FIG. 14.

$\Delta y'$: This parameter is included in the second left sides of the expressions (1) and (2), and represents the dimension tolerance of the front end face 15a of the film holding projection 15 in the y'-direction with the centers of the pins 16 being the reference.

$\Delta x'$: This parameter is included in the second left sides of the expressions (5) and (6), and represents the dimension tolerance of the front end face 15a of the film holding projection 15 in the x'-direction with the centers of the pins 16 being the references.

Figure 15:
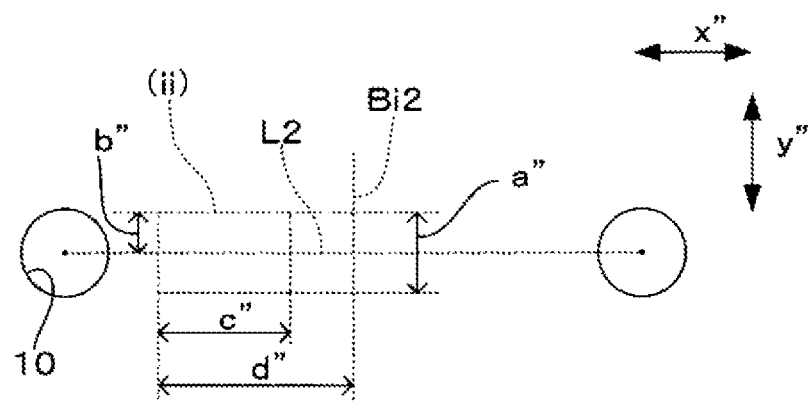
FIG. 15 An explanation view useful to describe parameters for the film-containing base plate (II) in the conditional expressions in the lens array fabrication method according to the embodiment of the present invention.

<Parameters for the Film-Containing Base Plate (II)> a": This parameter is included in the right side of the expression (2) and the left side of the expression (4), and represents the dimension of the stacked elements (B) to (F) on the placement area (ii) in the y"-direction, as shown in FIG. 15 (i.e., the length of the placement area (ii) in the y"-direction).

b": This parameter is included in the right sides of the expressions (1) and (2) as well as in the left sides of the expressions (3) and (4), and represents the distance in the y"-direction from the second hypothetical line segment L2 to the distal end of the stacked elements (B) to (F) in the y"-direction, as shown in FIG. 15 (i.e., the distance from the line segment L2 to the distal end of the placement area (ii) in the y"-direction).

c": This parameter is included in the right side of the expression (6) and in the left side of the expression (8), and represents the dimension of the stacked elements (B) to (F) in the x"-direction, as shown in FIG. 15 (i.e., the length of the placement area (ii) in the x"-direction).

d": This parameter is included in the right sides of the expressions (5) and (6) as well as in the left sides of the expressions (7) and (8), and represents the distance in the x"-direction from the vertical bisector Bi2, which equally divides the second hypothetical line segment L2 and extends in parallel to the y"-direction, to the distal end of the stacked elements (B) to (F) in the x"-direction, as shown in FIG. 15 (i.e., the distance from the vertical bisector Bi2 to the distal end of the placement area (ii) in the x"-direction).

$\Delta y"$: This parameter is included in the right sides of the expressions (1) and (2) as well as in the left sides of the expressions (3) and (4), and represents the dimension tolerance or allowance of the stacked elements (B) to (F) in the y"-direction with the centers of the second guide holes 10 being the references (i.e., the dimension tolerance of the placement area (ii) in the y"-direction).

$\Delta x"$: This parameter is included in the right sides of the expressions (5) and (6) as well as in the left sides of the expressions (7) and (8), and represents the dimension tolerance of the stacked elements (B) to (F) in the x"-direction with the centers of the second guide holes 10 being the references (i.e., the dimension tolerance of the placement area (ii) in the x"-direction).

<Meaning of the Conditional Expressions>

If the magnitude relation between the second left side and the right side in each of the conditional expressions (1), (2), (5) and (6) is satisfied, with the presumption that the center points of the second guide holes 10 overlap the center points of the pins 16 respectively, then it is possible to put the stacked elements (B) to (F) (i.e., the placement area (ii)) on the front end face (free end face) 15a of the film holding projection 15 without hanging out of the front end face 15a in the y'-direction and the x'-direction. This is nothing else but the holding area (iii), which corresponds to the placement area (ii) in position and dimension, can be placed on the front end face 15a of the film holding projection 15.

As long as the magnitude relation between the left side and the second left side in each of the conditional expressions (1), (2), (5) and (6) is satisfied, then it is possible to put the front end face 15a of the film holding projection 15 on the optical plane 4 without hanging out of the optical plane 4 in the y-direction and the x-direction, if the center points of the pins 16 overlap the center points of the first guide holes 7 respectively. This is nothing else but the film holding projection 15 can be received in the recess 6 of the second surface S2.

The fact that the film holding projection 15 can be received in the recess 6 of the second surface S2 means that it is possible to place (pile) the holding area (iii), which is secured on the front end face 15a of the film holding projection 15, on the optical plane 4 without hanging out of the optical plane 4 in the y-direction and the x-direction.

In order to say that the holding area (iii) which is piled in the above-mentioned manner corresponds to the adhesive area (i), it is necessary for the holding area (iii) to encompass the projected region 2' for part of the lens surfaces 2. This can be achieved when the conditional expressions (3), (4), (7) and (8) are all satisfied. Therefore, it is possible to secure the adhesive area (i), which corresponds to the holding area (iii) in position and dimension, on the optical plane 4.

<Actual Manufacturing Process>

With the foregoing being the prerequisite, the following steps will be carried out sequentially in this embodiment.

(First Step)

Figure 16A:
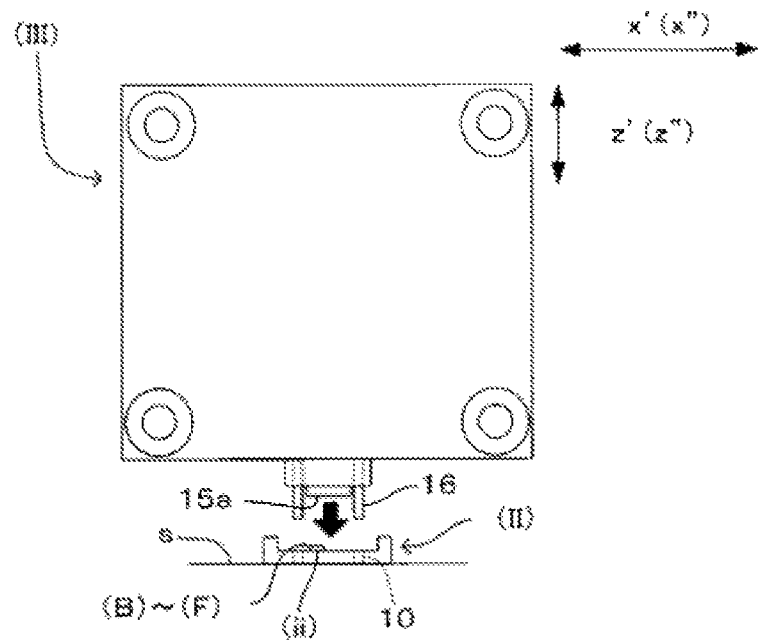
FIGS. 16A and 16B Explanation views which are useful to describe a first step of the lens array fabrication method according to the embodiment of the present invention.

In the first step, as shown in FIG. 16A, the front end face 15a of the film holding projection 15 of the film attaching jig (III) faces the stacked elements (B) to (F) on the placement area (ii) of the film-containing base plate (II) placed on a horizontal working plane s. It should be noted that in this step and the subsequent step (second step), the x'-direction coincides with the x"-direction, the y'-direction coincides with the y"-direction, and the z'-direction coincides with the z"-direction.

From this situation, the film attaching jig (III) is moved toward the film-containing base plate (II) while the two pins 16 of the film attaching jig (III) are inserted in the two second guide holes 10 of the film-containing base plate (II). As the two pins 16 abut onto the working plane s (if the second guide holes 10 are the through holes) or onto the bottoms of the second guide holes 10 (if the second guide holes have the bottoms), the two pins 16 shrink (contract) in the directions against the biasing force of the biasing member 17 (see FIG. 10) and therefore the distance between the film holding projection 15 and the stacked elements (B) to (F) is gradually reduced.

The above-described movement of the film attaching jig (III) may be performed by hand or by a dedicated actuator. The same applies hereinafter.

Figure 16B:
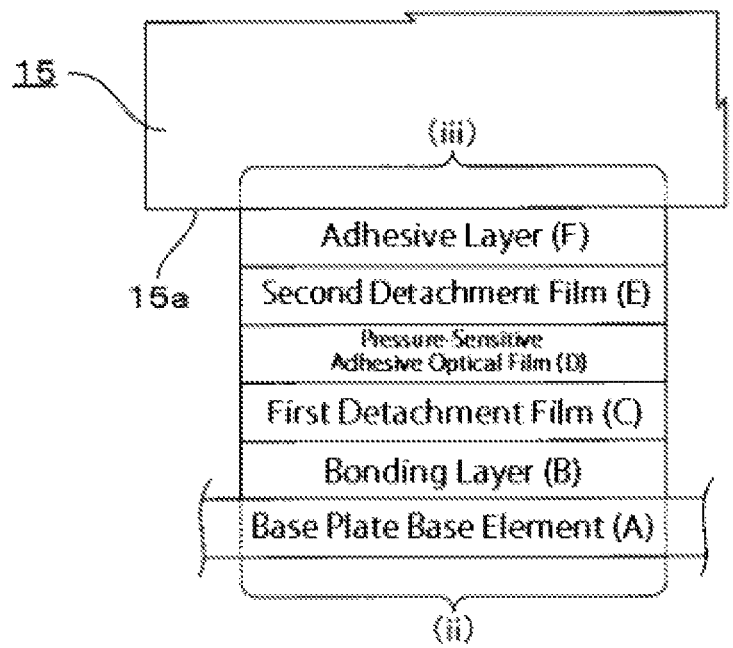

As a result, as shown in FIG. 16B, the holding area (iii) of the film holding projection 15 and the upper face of the pressure-sensitive adhesive layer (F), which is the uppermost layer of the stacked elements (B)-(F), attaches to each other by the adhesive force of the pressure-sensitive adhesive layer (F).

In order to prevent the stacked elements (B)-(F) from being collapsed by the film holding projection 15, there may be provided a certain mechanism or the like to regulate the shrinking amounts of the pins 16. For example, this mechanism may include one or more stoppers provided on the mount 14, which can exert the abutting force to prohibit the pins 16 from contracting over a predetermined amount. Alternatively, the actuator may be programmed to regulate the movement of the film attaching jig (III).

Second Step

Figure 17A:
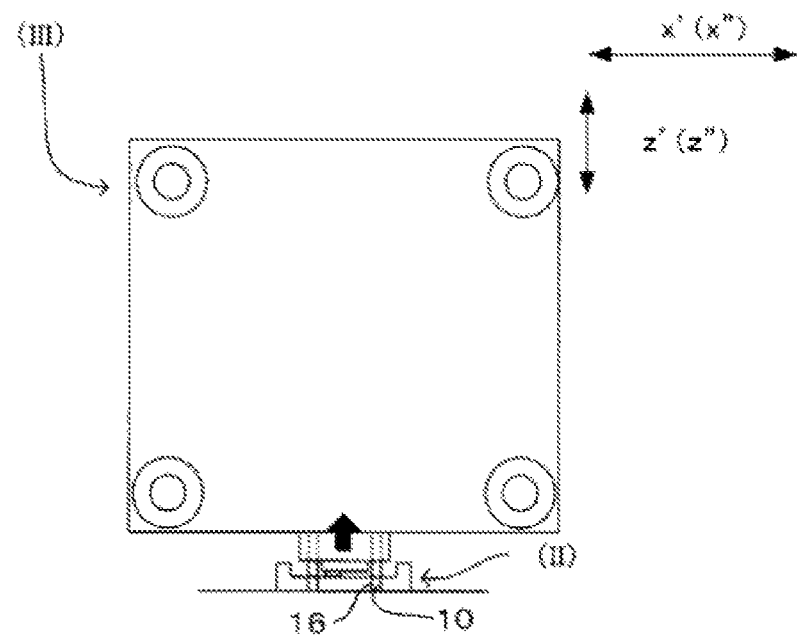
FIGS. 17A and 17B Explanation views which are useful to describe a second step of the lens array fabrication method according to the embodiment of the present invention.

At the second step, as shown in FIG. 17A, the film attaching jig (III) is moved apart from the film-containing base plate (II) while the two pins 16 are pulled out of the two second guide holes 10.

Figure 17B:
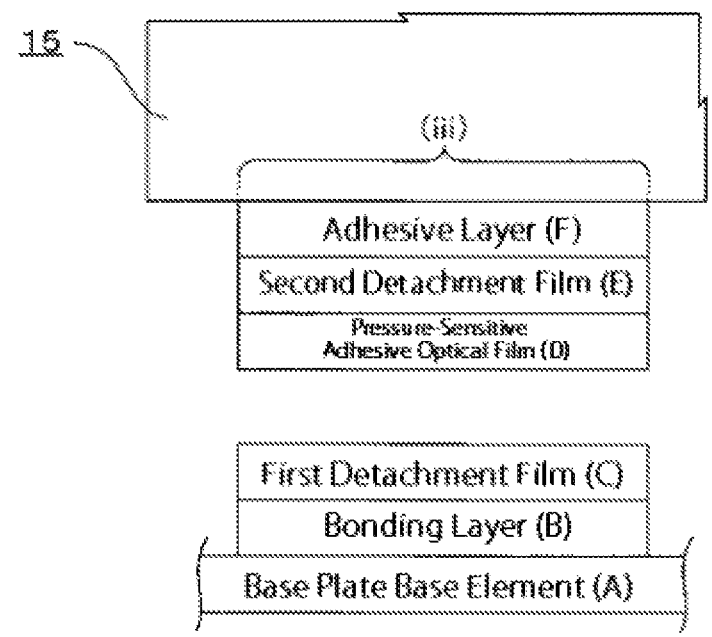

Because of the magnitude relation between the first peel strength $f_{(C)-(D)}$ and the second peel strength $f_{(D)-(E)}$, the peeling (detachment) takes place between the first detachment film (C) and the pressure-sensitive adhesive optical film (D). As shown in FIG. 17B, therefore, the upper three layers (D)-(F) are separated from the lower two layers (B) and (C) which remain on the base plate main element (A), with the upper three layers (D)-(F) being held on the holding area (iii) of the film holding projection 15.

Specifically, the second step satisfies the equation (9).

$$f_{(C)-(D)} < f_{(D)-(E)} < f_{(A)-(B)}, f_{(B)-(C)}, f_{(E)-(F)}, f_{(F)-(III)} \quad (9)$$

where $f_{(A)-(B)}$ is a peel strength between the base plate main element (A) and the bonding layer (B) (hereinafter referred to as a third peel strength), and $f_{(B)-(C)}$ is a peel strength between the bonding layer (B) and the first detachment film (C) (hereinafter referred to as a fourth peel strength). $f_{(E)-(F)}$ is a peel strength between the second detachment film (E) and the adhesive layer (F) (hereinafter referred to as a fifth peel strength). $f_{(F)-(III)}$ is a peel strength between the adhesive layer (F) and the film attaching jig (III) (hereinafter referred to as a sixth peel strength).

The peeled situation shown in FIG. 17B is reliably obtained by satisfying the magnitude relation among the first peel strength to the sixth peel strength.

(Third Step)

Figure 18A:
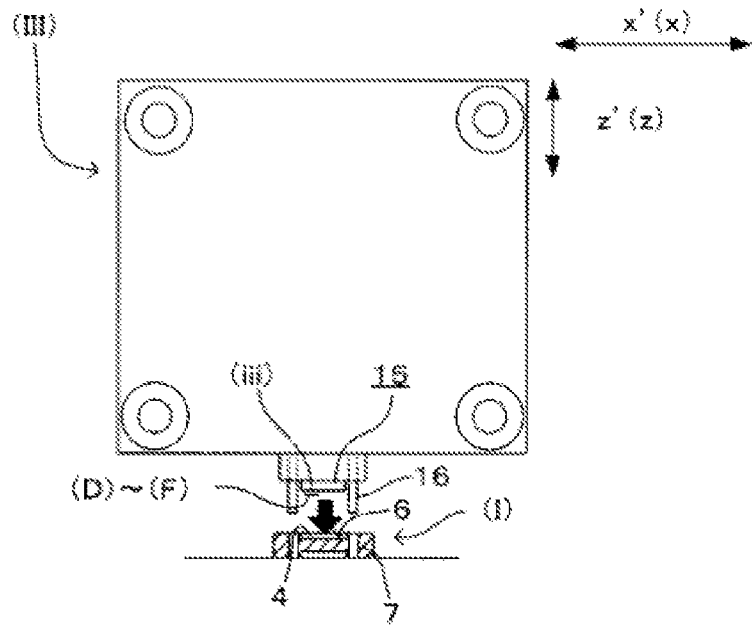
FIGS. 18A and 18B Explanation views which are useful to describe a third step of the lens array fabrication method according to the embodiment of the present invention.

In the third step, as shown in FIG. 18A, the three layers (D)-(F) held on the holding area (iii) of the film holding projection 15 face the optical plane 4 of the lens array main unit (I). It should be noted that in this step and the subsequent step (fourth step), the x'-direction coincides with the x-direction, the y'-direction coincides with the y-direction, and the z'-direction coincides with the z-direction.

From this situation, the film attaching jig (III) is moved toward the lens array main unit (I) while the two pins 16 of the film attaching jig (III) are inserted in the two first guide holes 7 of the lens array main unit (I). In the meanwhile, the film holding projection 15 is received in the recess 6 of the second surface S2 together with the three layers (D)-(F).

Figure 18B:
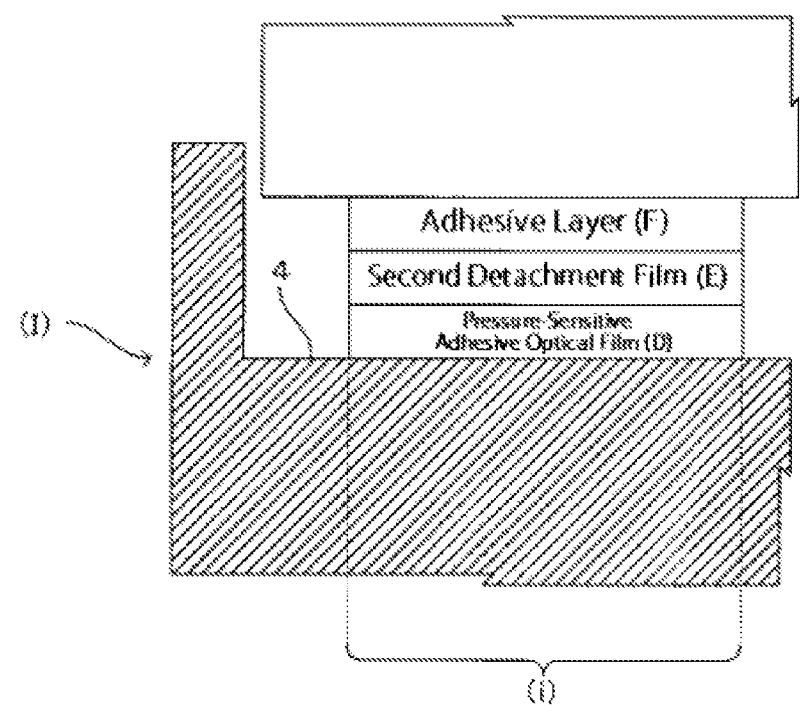

As a result, as shown in FIG. 18B, the lower face of the pressure-sensitive adhesive optical film (D), which is the lowermost layer of the three layers (D)-(F), is attached to the adhesion area (i) of the optical plane 4 by the adhesive force of the pressure-sensitive adhesive optical film (D).

23

(Fourth Step)

Figure 19A:
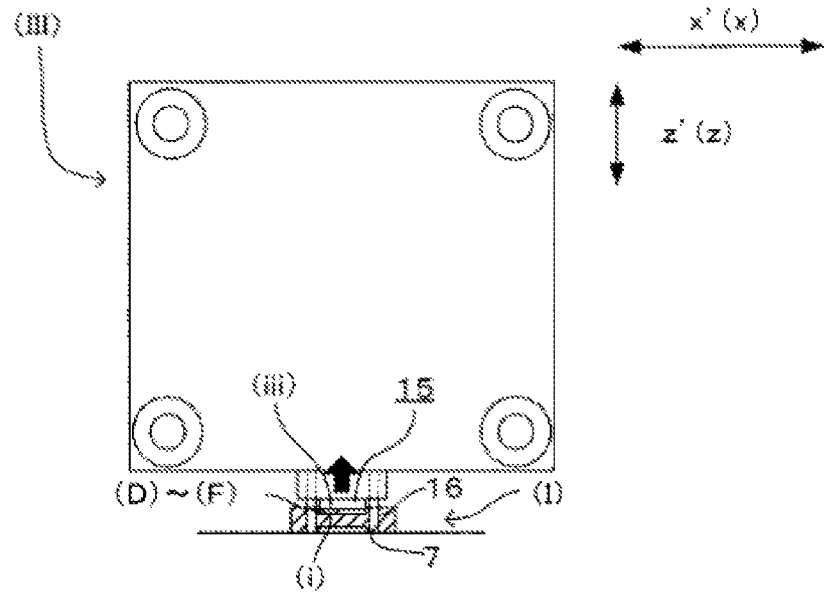
FIGS. 19A and 19B Explanation views which are useful to describe a fourth step of the lens array fabrication method according to the embodiment of the present invention.

In the fourth step, as shown in FIG. 19A, the film attaching jig (III) is moved apart from the lens array main unit (I) while the two pins 16 are pulled out of the first guide holes 7.

At this point, the equation (10) is satisfied.

$$f_{(D)-(E)} < f_{(D)-(D)}, f_{(E)-(F)}, f_{(F)-(III)} \qquad (10)$$

where $f_{(D)-(D)}$ is a peel strength (seventh peel strength) between the lens array main body (I) and the pressure-sensitive adhesive optical film (D).

Figure 19B:
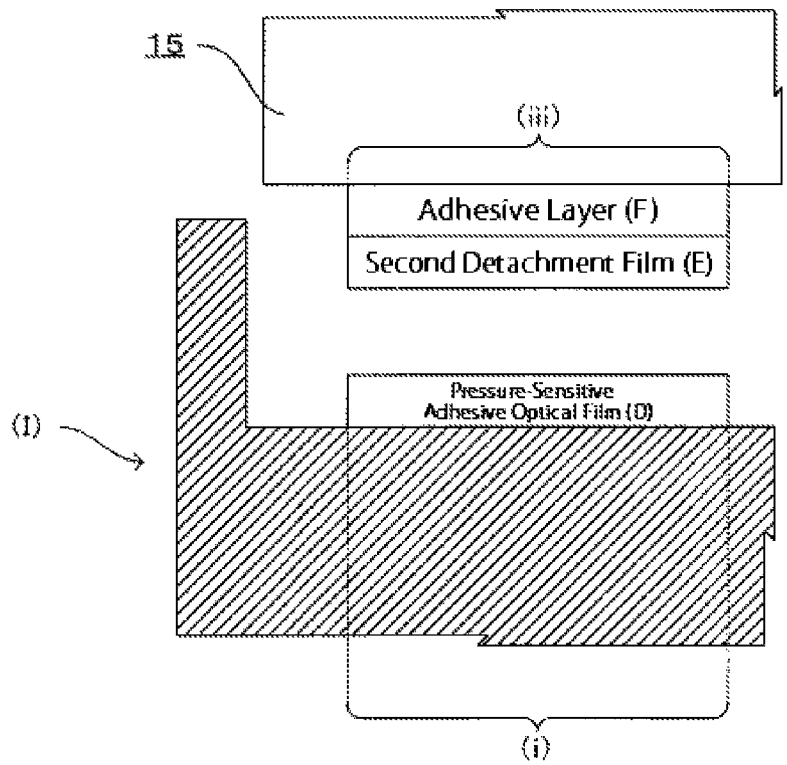

In this manner, the second peel strength is smaller than the fifth to seventh peel strengths, and therefore the peeling takes place between the pressure-sensitive adhesive optical film (D) and the second peel film (E). As shown in FIG. 19B, the upper two layers, i.e., the layers (E) and (F), are removed from the pressure-sensitive adhesive optical film (D) that remains on the attachment area (i) while the upper two layers (E) and (F) are retained on the holding area (iii) of the film holding projection 15. Of course the adhesiveness between the attachment area (i) and the pressure-sensitive adhesive optical film (D) is the strongest.

In this way, the lens array 1 is obtained which has the pressure-sensitive adhesive optical film (D) adhered on the attachment area (i) with the pressure-sensitive adhesive optical film (D) being closer to the lens surfaces 2 than the peripheral area 5 of the second face S2 (see FIG. 1).

Figure 20:
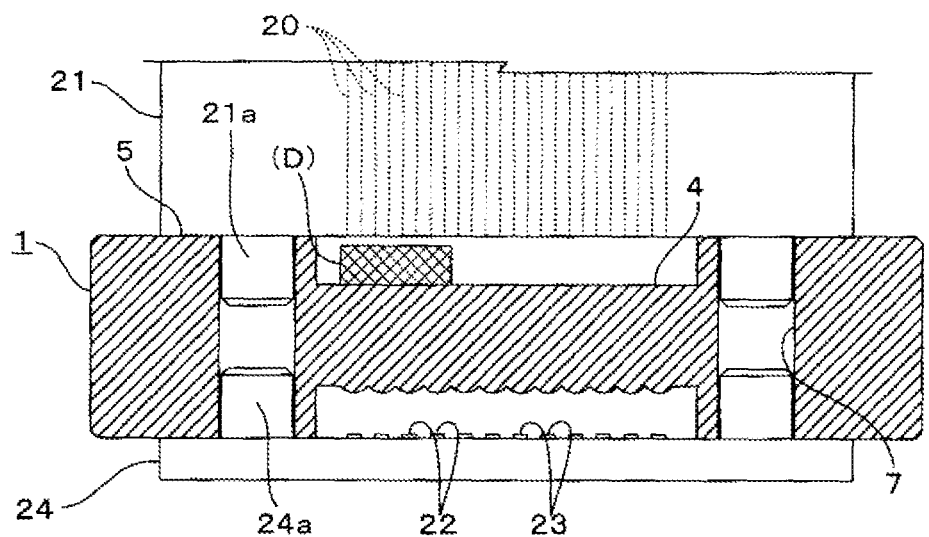
FIG. 20 A structural view useful for showing the actual use of the lens array fabrication method according to the embodiment of the present invention.

According to this embodiment, the film holding projection 15 of the film attaching jig (III) can cause the pressure-sensitive adhesive optical film (D), held on the holding area of the projection 15, to reach the optical plane 4 received in the lens array main unit (I). Thus, it is possible to appropriately attach the pressure-sensitive adhesive optical film (D) onto the attachment area (i) of the optical plane 4 that only corresponds to the predetermined part of the lens surfaces 2 with reduced adhesion defects. Because the film-containing base plate (II) contains a plurality of films that have different peel strengths arranged in an ingenious way depending upon the desired order of peeling, it is possible to easily attach the pressure-sensitive adhesive optical film (D) by simply performing the step of transferring the pressure-sensitive adhesive optical film (D) to the film attaching jig (III) from the film-containing base plate (II) and the step of transferring the pressure-sensitive adhesive optical film (D) to the lens array main unit (I) from the film attaching jig (III). When the pressure-sensitive adhesive optical film (D) is attached, the pins 16 of the film attaching jig (III) are guided and supported by the second guide holes 10 of the film-containing base plate (II) and the first guide holes 7 of the lens array main unit (I), the transferring of the pressure-sensitive adhesive optical film (D) between the film-containing base plate (II) and the film attaching jig (III) becomes smooth and the transferring of the pressure-sensitive adhesive optical film (D) between the film attaching jig (III) and the lens array main unit (I) becomes smooth. Thus, the attaching of the pressure-sensitive adhesive optical film (D) is further facilitated. When the pressure-sensitive adhesive optical film (D) is attached, the conditional expressions (1) to (8) are satisfied. Thus, it is possible to precisely attach the pressure-sensitive adhesive optical film (D) by the simple steps. Because the pressure-sensitive adhesive optical film (D), which has been attached to the adhesion area (i), does not protrude from the peripheral area 5, it is possible to avoid a stress from acting on the attached pressure-sensitive adhesive optical film (D) upon mounting of the optical transmission element or the photoelectric conversion device. It should be noted that FIG. 20 shows a configuration with a plurality of optical fibers 20 being employed as the optical transmission element. The optical fibers 20 are housed in an optical connector 21, and the optical connector 21 is mounted on the optical plane 4 side and is in contact with the peripheral area 5. Also, the photoelectric conversion device 24 is mounted on the lens surfaces 2 side. The photoelectric conversion device 24 includes a plurality of light emitting elements 22, such as VCSELs, arranged in a predetermined pattern, and a plurality of light receiving elements 23, such as photodetectors, arranged in a predetermined pattern. FIG. 20 illustrates an example of actual application. It is quite obvious from FIG. 20 that the optical connector 21 applies no stress on the pressure-sensitive adhesive optical film (D). In FIG. 20, the first guide holes 7 (through holes) receive the positioning pins 21*a* provided on the optical connector 21 to position the optical connector 21 (to decide the mounting position of the optical connector 21), and receive the positioning pins 24*a* provided on the photoelectric conversion device 24 (on a semiconductor substrate) to position the photoelectric conversion device 24.

MODIFIED EMBODIMENTS

The present invention may be applied in a variety of configurations other than the above-described method.

Modification 1

Figure 21:
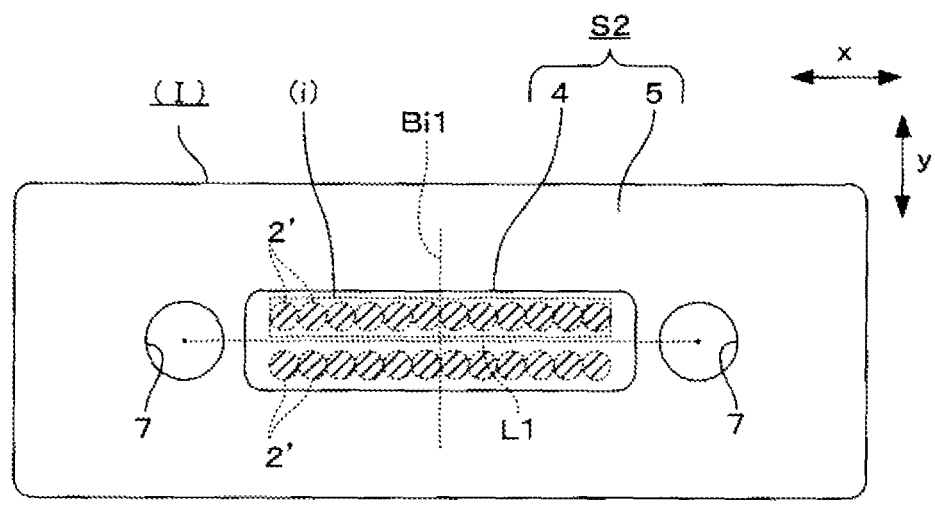
FIG. 21 An explanation view useful to describe a first modification according to the present invention.

In the above-described embodiment, the predetermined part of the lens surfaces 2 which correspond to the attachment area (i) of the pressure-sensitive adhesive optical film (D) includes some lens surfaces (left four lens surfaces 2 in FIG. 2) among the entire lens surfaces 2 aligned in the x-direction. For example, however, as shown in FIG. 21, there may be a plurality of (two) rows of the lens surfaces 2 arranged in the x-direction and spaced from each other in the y-direction, as indicated by the projected region 2', and all the lens surfaces 2 in one of these two rows may be treated as the "predetermined part of the lens surfaces 2." It should also be noted that some of the lens surfaces 2 in one (or more) of a plurality of rows may be treated as the "predetermined part of the lens surfaces 2" although this configuration is not shown.

Modification 2

Figure 22A:
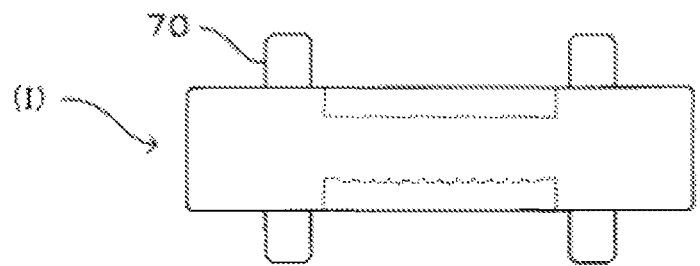
FIGS. 22A, 22B, and 22C Explanation views that are useful to describe a second modification according to the present invention.
Figure 22B:
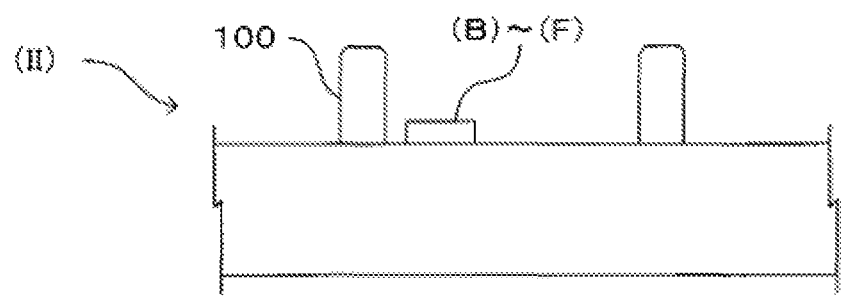
Figure 22C:
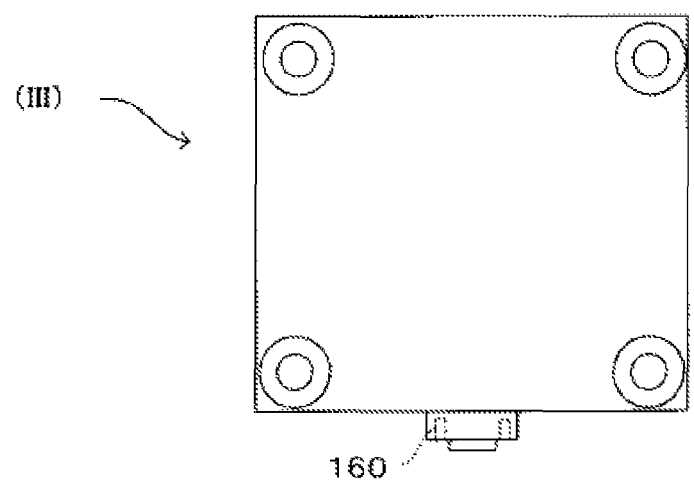
Figure 23:
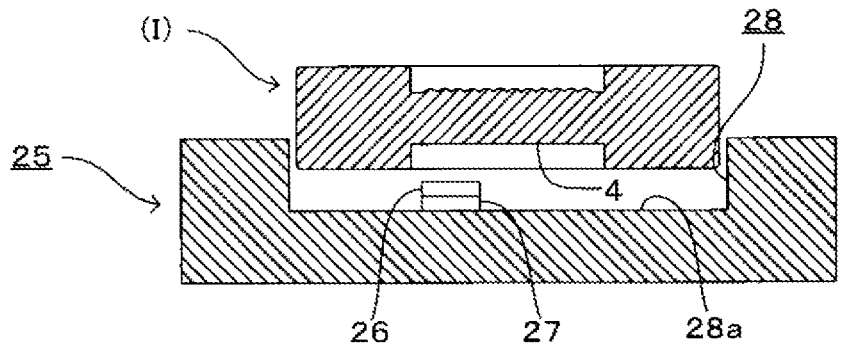
FIG. 23 An explanation view useful to describe a lens array fabrication method according to a comparative example, which is shown in the detailed description of the present invention FIG. 24 A graph showing experimental results of an environmental test according to the embodiment of the present invention.

As shown in FIG. 22A, first guide pins 70 may be provided on the lens array main unit (I), instead of the first guide holes 7, such that the first guide pins 70 protrude from the lens array main unit (I) at the same positions as the first guide holes 7. As shown in FIG. 22B, second guide pins 100 may be provided on the film-containing base plate (II), instead of the second guide holes 10, such that the second guide pins 100 protrude from the film-containing base plate (II) at the same positions as the second guide holes 10. As shown in FIG. 22C, holes 160 may be provided in the film attaching jig (III), instead of the pins 16, such that the holes 160 extend at the same positions as the pins 16.

In this configuration, the outer diameter of each of the first guide pins 70 may be the same as the outer diameter of each of the second guide pins 100. The inner diameter of each of the holes 160 is slightly larger than the outer diameter of each first guide pin 70 and the outer diameter of each second guide pin 100.

In this configuration, the first guide holes 7 of the above-described embodiment may be replaced with the first guide pins 70, the pins 16 may be replaced with the holes 160, and the second guide holes 10 may be replaced with the second guide pins 100.

Examples

An environmental test was carried out on the lens array 1, which had the light attenuation film (i.e., the pressure-sensitive adhesive optical film (D)) attached by the above-described method (first to fourth steps), to check stability in the optical coupling loss of the light attenuation film.

For the lens array 1 used in the environmental test, the equations (1) to (8) had the following parameters.

Lens Array Data
Parameters for Equation (1)

$a1+\Delta y=0.35\pm0.03$ mm $a1'+\Delta y'=0.3\pm0.015$ mm $b''+\Delta y''=0.28-0.02$ mm Parameters for Equation (2)

$a2+\Delta y=0.35\pm0.03$ mm $a2'+\Delta y'=0.3\pm0.015$ mm $|a''-b''|+\Delta y''=0.28\pm0.02$ mm Parameters for Equation (3)

$b''+\Delta y''=0.28-0.02$ mm $b1+\Delta y=0.25\pm0.005$ mm

Parameters for Equation (4)

$|a''-b''|+\Delta y''=0.28-0.02$ mm $|b1-b2|+\Delta y=0.25\pm0.005$ mm

Parameters for Equation (5)

$c1+\Delta x=1.65\pm0.03$ mm $c1'+\Delta x'=1.6\pm0.015$ mm $d''+\Delta x''=1.58-0.02$ mm Parameters for Equation (6)

$c2+\Delta x=1.65\pm0.03$ mm $c2'+\Delta x'=1.6+0.015$ mm $|c''-d''|+\Delta x''=1.58-0.02$ mm Parameters for Equation (7)

$d''+\Delta x''=1.58-0.02$ mm $d1+\Delta x=1.5\pm0.005$ mm

Parameters for Equation (8)

$|c''-d''|+\Delta x''=1.58-0.02$ mm $|d1-d2|+\Delta x=1.5\pm0.005$ mm

The lens arrays 1 that were configured with these parameters satisfied all of Equations (1) to (8).

A comparative example was prepared for this environmental test. A lens array of the comparative example was prepared by a fabrication method shown in FIG. 23. Specifically, the fabrication method of FIG. 23 used a film plate 25 on which a light attenuation film 26 was placed. A recess 28 was made in the center area of the upper face of the plate main body. The recess 28 had a larger size than the lens array main unit (I) in the x-direction and the y-direction such that predetermined gaps were left between the lens array main unit (I) and the recess 28. A detachment film 27 and a light attenuation film 26 were piled on a bottom face 28a of the recess 28 such that the detachment film 27 and the light attenuation film 26 were located at a position that corresponded to the "predetermined part of the lens surfaces 2." Then, the lens array main unit (I) was put in the recess 28 of the film plate 25 with the optical plane 4 facing down, and the light attenuation film 26 was attached (adhered) to the optical plane 4.

In the environmental test, the sample prepared by the fabrication method of the present invention and the sample of the comparative example were subjected to the temperature of 85 degrees C. and the humidity of 85%. The coupling loss of each sample was measured when 1000 hours passed from the start of the test and when 2000 hours passed from the start of the test. The coupling loss was a value of the change from the before-the-test. The configuration shown in FIG. 20, which had the VCSEL and the optical fibers, was used when the coupling loss was measured.

Figure 24:
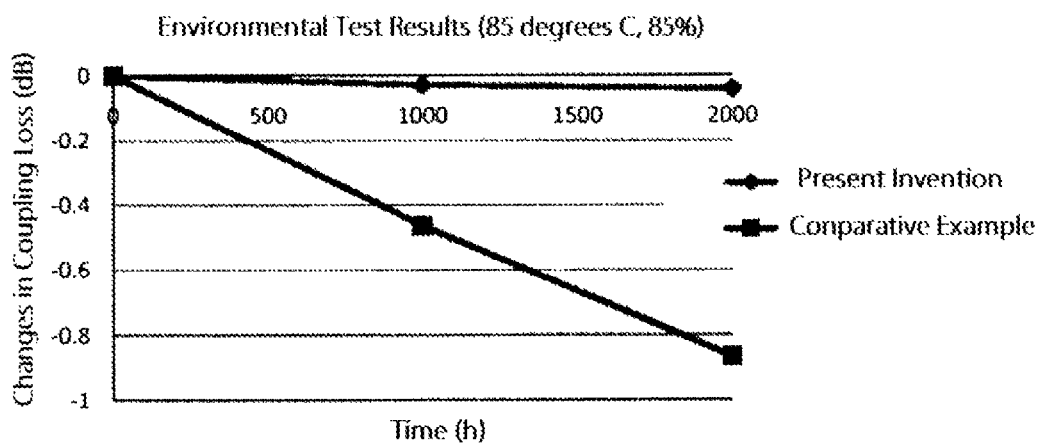
Figure 25:
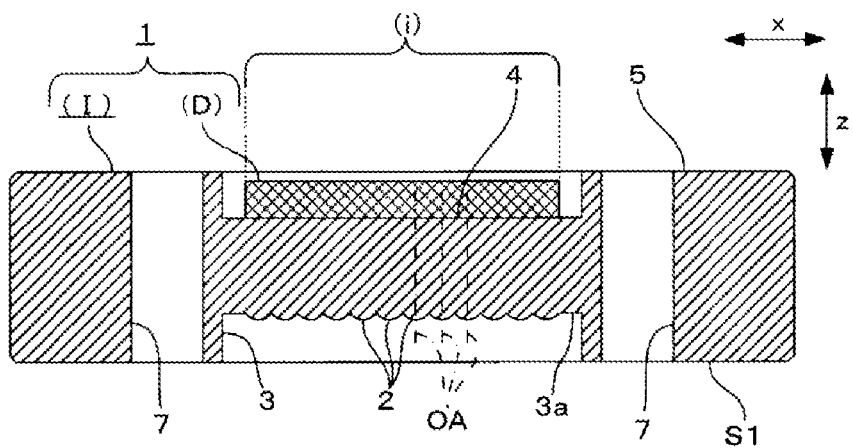
FIG. 25 A cross-sectional view of a lens array according to a third modification of the present invention.
Figure 26:
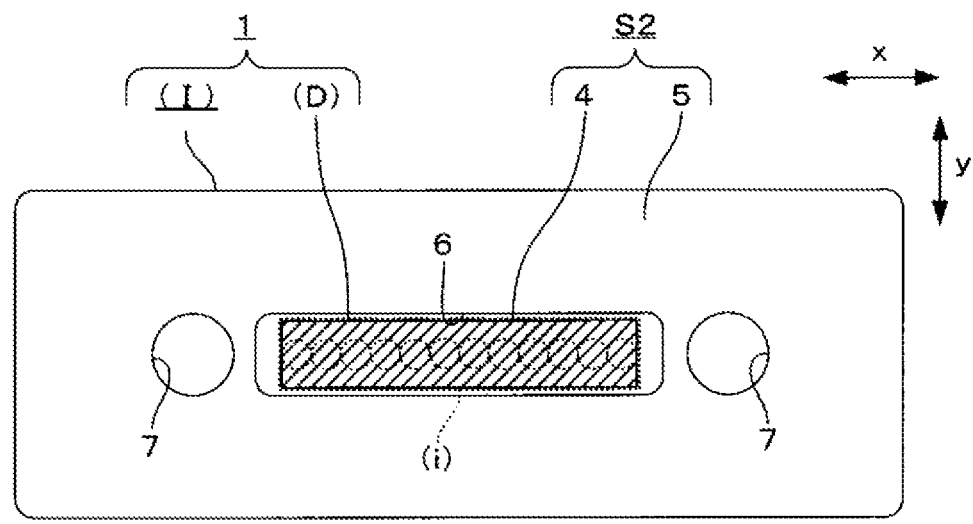
FIG. 26 A plan view of the lens array shown in FIG. 25.

The results of the environmental test are shown in FIG. 24.

As understood from the results shown in FIG. 24, the lens array 1 that was prepared by the manufacturing method of the present invention had little deteriorations (less than −0.05 dB) in the coupling loss even when 2000 hours passed. This indicates that the lens array 1 prepared by the manufacturing method of the present invention can be used for a long time at high temperature and high humidity. On the other hand, the lens array prepared by the manufacturing method shown in FIG. 23 had the coupling loss change over −0.8 dB when 2000 hours passed. This indicates that the lens array prepared by the manufacturing method shown in FIG. 23 cannot be used for a long time at high temperature and high humidity. These results show that the manufacturing method of the present invention can attach (adhere) the light attenuation film onto the optical plane 4 with reduced adhesion defects such as wrinkles, bubbles, rolling up and floating.

It should be noted that the present invention is not limited to the above-described embodiments and modifications, and various changes and modifications may be made to the extent that the characterizing features of the present invention are not impaired.

Figure 27:
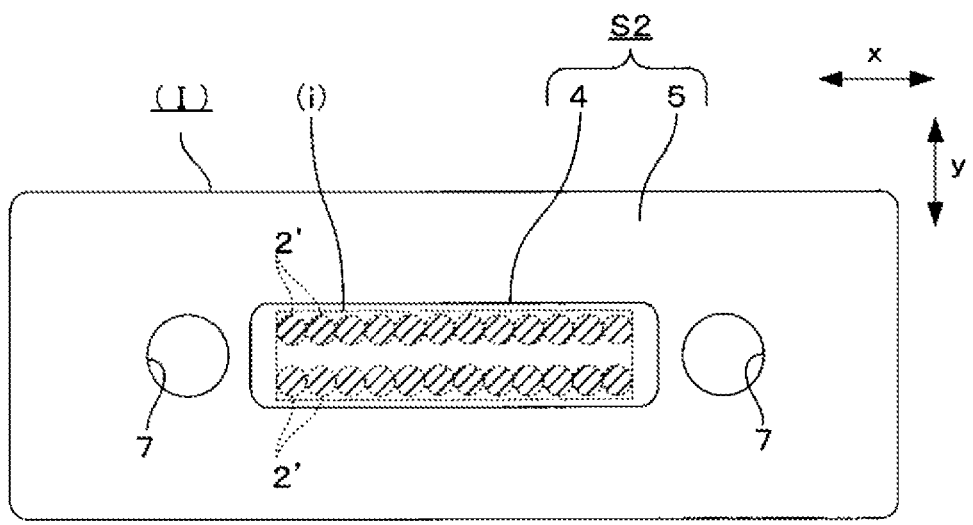
FIG. 27 A plan view of a lens array according to a fourth modification of the present invention.

For example, although the attachment area (i) encompasses the projected region 2' of the predetermined part of the lens surfaces 2 in the above-described embodiment, the attachment area (i) may encompass the projected region 2' of the entire lens surfaces 2 as in the third modification (FIGS. 25 and 26) and the fourth modification (FIG. 27).

EXPLANATIONS OF LETTERS NUMERALS

1 Lens array
2 Lens surfaces
2' Projected region
4 Optical plane
5 Peripheral area
6 Recess
7 First guide holes
10 Second guide holes
15 Film holding projection
15a Front end face
16 Pins

The invention claimed is:

1. A film-containing base plate (II) for use in fabricating a lens array including a lens array main unit (I) including:
- a first surface and a second surface spaced from each other in an optical axis direction (hereinafter referred to as a z-direction);
- a plurality of lens surfaces formed and aligned on the first surface along a predetermined alignment direction which is perpendicular to the z-direction (hereinafter referred to as a x-direction);
- a planar optical plane on the second surface, through which light that has passed the plurality of lens surfaces is to pass, the planar optical plane defining a predetermined central area of the second surface, which predetermined central area encompasses an entire orthographic projection area formed on the second surface when projecting the lens surfaces from the z-direction toward the second surface,
- a surrounding area being defined on the second surface around the predetermined central area, the planar optical plane being defined by a bottom surface of a recess that is concave relative to the surrounding area and depressed toward the lens surfaces, the planar optical plane extending in a direction perpendicular to the z-direction; and
- a pair of first guide holes or guide pins that are disposed on opposite sides in relation to the planar optical plane in the x-direction on the surrounding area of the second surface, the pair of first guide holes or guide pins extending parallel to the z-direction,
- an adhesion area (i) being defined, which contains part of the orthographic projection area projected from at least part of the plurality of lens surfaces, on the planar optical plane of the lens array main unit (I), said film-containing base plate (II) comprising:
- a base plate main element (A) having a placement area (ii) on a first face of the base plate main element (A) in a z"-direction that corresponds to the z-direction, the placement area (ii) corresponding to the adhesion area (i); and
- a pressure-sensitive adhesive optical film (D) to be attached in the adhesion area (i) by an adhesive force of the pressure-sensitive adhesive optical film (D) itself, said film-containing base plate (II) further comprising:
- a bonding layer (B);
- a non-adhesive first detachment film (C);
- a non-adhesive second detachment film (E), and
- an adhesion layer (F),
- wherein the bonding layer (B), the non-adhesive first detachment film (C), the pressure-sensitive adhesive optical film (D), the non-adhesive second detachment film (E), and the adhesion layer (F) are stacked on the placement area (ii) in this order from the placement area (ii) side,
- wherein a first peel strength f(C)-(D) between the first detachment film (C) and the pressure-sensitive adhesive optical film (D) is smaller than a second peel strength f(D)-(E) between the pressure-sensitive adhesive optical film (D) and the second detachment film (E), wherein a face of the pressure-sensitive adhesive optical film (D) attached to the first detachment film (C) is to be attached in the adhesion area of the orthographic projection area by an adhesive force of the pressure-sensitive adhesive optical film (D) itself, and
- wherein a pair of second guide holes or guide pins, which correspond to the pair of first guide holes/guide pins respectively, are provided in a region outside the placement area (ii) on the first face of the base plate main element (A), the second guide holes or guide pins being disposed on opposite sides over the placement area (ii) in a x"-direction, which corresponds to the x-direction, and the second guide holes or guide pins being parallel to the z"-direction.

2. The film-containing base plate (II) according to claim 1, wherein:
- a first mold release treatment surface of the first detachment film (C) and a second mold release treatment surface of the second detachment film (E) are both disposed on the pressure-sensitive adhesive optical film (D) side,
- a conditional expression (9) is satisfied:

$$f(C)\text{-}(D) < f(D)\text{-}(E) < f(A)\text{-}(B), f(B)\text{-}(C), f(E)\text{-}(F), f(F)\text{-}(III) \qquad (9)$$

where f(A)-(B) is a third peel strength between the base plate main element (A) and the adhesive layer (B),
f(B)-(C) is a fourth peel strength between the bonding layer (B) and the first detachment film (C),
f(E)-(F) is a fifth peel strength between the second detachment film (E) and the adhesive layer (F),
f(F)-(III) is a sixth peel strength between the adhesive layer (F) and a film attaching jig (III) for attaching the pressure-sensitive adhesive optical film (D) onto the adhesion area (i), and
a conditional expression (10) is satisfied:

$$f(D)\text{-}(E) < f(I)\text{-}(D), f(E)\text{-}(F), f(F)\text{-}(III) \qquad (10)$$

where f(I)-(D) is a seventh peel strength between the lens array main unit (I) and the pressure-sensitive adhesive optical film (D).

* * * * *